US012786900B2

(12) United States Patent
Kwak et al.

(10) Patent No.: US 12,786,900 B2
(45) Date of Patent: Nov. 3, 2026

(54) METHOD AND APPARATUS FOR TRANSMISSION AND RECEPTION OF SYNCHRONIZATION SIGNAL HAVING LAYERED STRUCTURE IN COMMUNICATION SYSTEM

(71) Applicant: ELECTRONICS AND TELECOMMUNICATIONS RESEARCH INSTITUTE, Daejeon (KR)

(72) Inventors: Byung Jae Kwak, Daejeon (KR); Kapseok Chang, Daejeon (KR); Won Cheol Cho, Daejeon (KR); Young-Jo Ko, Daejeon (KR); Yong Sun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 783 days.

(21) Appl. No.: 18/129,206

(22) Filed: Mar. 31, 2023

(65) Prior Publication Data

US 2023/0319738 A1 Oct. 5, 2023

(30) Foreign Application Priority Data

Apr. 1, 2022 (KR) ........................ 10-2022-0041317
Mar. 31, 2023 (KR) ........................ 10-2023-0043150

(51) Int. Cl.
*H04W 56/00* (2009.01)

(52) U.S. Cl.
CPC .................................. *H04W 56/00* (2013.01)

(58) Field of Classification Search
CPC ..... H04W 56/00; H04L 27/2613; H04L 5/005
See application file for complete search history.

(56) References Cited

U.S. PATENT DOCUMENTS 7,924,808 B2 4/2011 Han et al.
8,126,042 B2 * 2/2012 Schenk .................. H04B 3/487
375/252

(Continued)

FOREIGN PATENT DOCUMENTS

AU 2014261936 A1 * 11/2015 ....... H04L 25/03159
CN 113824467 A * 12/2021 ............. H04B 1/525

(Continued)

OTHER PUBLICATIONS

3GPP, "3rd Generation Partnership Project; Technical Specification Group Radio Access Network; NR; Physical channels and modulation (Release 17)", 3GPP TS 38.211 V17.0.0 (Dec. 2021).

*Primary Examiner* — Saad A. Waqas
(74) *Attorney, Agent, or Firm* — LRK PATENT LAW FIRM

(57) ABSTRACT

An operation method of a first communication apparatus may include: identifying one or more synchronization signal components constituting a synchronization signal component set; generating a plurality of synchronization signal sections based on the one or more synchronization signal components and a plurality of primary coefficients corresponding to the one or more synchronization signal components; generating one or more synchronization signal parts based on a combination of the plurality of synchronization signal sections; generating one or more synchronization signals based on a combination of the one or more synchronization signal parts in time domain; and transmitting the generated one or more synchronization signals.

20 Claims, 13 Drawing Sheets

(56) References Cited

U.S. PATENT DOCUMENTS

| | | | |
|---|---|---|---|
| 10,326,546 | B2 | 6/2019 | El Ayach et al. |
| 11,140,646 | B2 | 10/2021 | Chang et al. |
| 2013/0022017 | A1 | 1/2013 | Han et al. |
| 2013/0259013 | A1 | 10/2013 | Malladi et al. |
| 2015/0263875 | A1 | 9/2015 | Chang et al. |
| 2018/0270095 | A1 | 9/2018 | Ahmad et al. |

FOREIGN PATENT DOCUMENTS

| | | | | |
|---|---|---|---|---|
| WO | WO-2010078876 | A2 * | 7/2010 | ......... H04L 27/2626 |
| WO | 2018/164414 | A1 | 9/2018 | |

* cited by examiner

100

METHOD AND APPARATUS FOR TRANSMISSION AND RECEPTION OF SYNCHRONIZATION SIGNAL HAVING LAYERED STRUCTURE IN COMMUNICATION SYSTEM

CROSS-REFERENCE TO RELATED APPLICATIONS

This application claims priority to Korean Patent Applications No. 10-2022-0041317, filed on Apr. 1, 2022, and No. 10-2023-0043150, filed on Mar. 31, 2023, with the Korean Intellectual Property Office (KIPO), the entire contents of which are hereby incorporated by reference.

BACKGROUND

1. Technical Field

Exemplary embodiments of the present disclosure relate to a technique for transmitting and receiving a synchronization signal in a communication system, and more particularly, to a technique for transmitting and receiving a synchronization signal having a layered structure in a communication system.

2. Description of Related Art

With the development of information and communication technology, various wireless communication technologies are being developed. Representative wireless communication technologies include long term evolution (LTE) and new radio (NR) defined as the 3rd generation partnership project (3GPP) standards. The LTE may be one of 4th generation (4G) wireless communication technologies, and the NR may be one of 5th generation (5G) wireless communication technologies. A wireless communication technology after the 5G wireless communication technology (e.g., the sixth generation (6G) wireless communication technology, etc.) may be referred to as 'beyond-5G (B5G) wireless communication technology'.

In an exemplary embodiment of a communication system, in order to access a radio network, a user may perform serving cell identification after acquiring time/frequency synchronization with the network. Operations such as synchronization acquisition and serving cell identification may be performed based on a synchronization signal. Here, the synchronization signal may correspond to a primary synchronization signal (PSS), a secondary synchronization signal (SSS), or a synchronization signal block (SSB) composed of the PSS and SSS.

In an exemplary embodiment of the communication system, the synchronization signal may be used to acquire time synchronization and/or frequency synchronization between a transmitting device and a receiving device. Meanwhile, the synchronization signal may be used for distance estimation using a transmission delay time, for distinguishing between a plurality of transmitting devices, or for estimating a radio channel between two radio communication devices. The synchronization signal may be generated in a variety of manners. The performance of each of the synchronization signals generated in various manners may be superior or inferior depending on a communication situation, communication environment, purpose, and the like. A synchronization signal transmission/reception technique that exhibits excellent performance of a synchronization operation and/or estimation operation based on the synchronization signal in various communication situations, communication environments, and uses may be required.

Matters described as the prior arts are prepared to help understanding of the background of the present disclosure, and may include matters that are not already known to those of ordinary skill in the technology domain to which exemplary embodiments of the present disclosure belong.

SUMMARY

Exemplary embodiments of the present disclosure provide are directed to providing a method and an apparatus for transmitting and receiving a synchronization signal having a layered structure, which can enhance synchronization performance in a communication system.

According to a first exemplary embodiment of the present disclosure, an operation method of a first communication apparatus may comprise: identifying one or more synchronization signal components constituting a synchronization signal component set; generating a plurality of synchronization signal sections based on the one or more synchronization signal components and a plurality of primary coefficients corresponding to the one or more synchronization signal components; generating one or more synchronization signal parts based on a combination of the plurality of synchronization signal sections; generating one or more synchronization signals based on a combination of the one or more synchronization signal parts in time domain; and transmitting the generated one or more synchronization signals.

The synchronization signal component set may have J synchronization signal components as elements, and the generating of the plurality of synchronization signal sections may comprise: determining a first synchronization signal component matrix using the J synchronization signal components; determining a first primary coefficient matrix having a same size as the first synchronization signal component matrix and composed of the plurality of primary coefficients; and generating the plurality of synchronization signal sections by multiplying elements corresponding to each other in the first synchronization signal component matrix and the first primary coefficient matrix, wherein J is a natural number equal to or greater than 1.

Each of the plurality of synchronization signal sections may correspond to one of first to N-th time periods distinguished from each other in time domain, and the generating of the one or more synchronization signal parts may comprise: performing a sum operation for synchronization signal sections corresponding to each of the first to N-th time periods among the plurality of synchronization signal sections, with respect to each of the first to N-th time periods; and generating first to N-th synchronization signal parts respectively corresponding to the first to N th time periods, based on results of the sum operations corresponding to the first to N-th time periods, wherein N is a natural number equal to or greater than 1.

The generating of the first to N-th synchronization signal parts may comprise: identifying first to N-th secondary coefficients respectively corresponding to the first to N-th time periods; performing a multiplication operation between the result of the sum operation corresponding to each of the first to N-th time periods and the first to N-th secondary coefficients corresponding to each of the first to N-th time periods; and obtaining the first to N-th synchronization signal parts respectively corresponding to results of the multiplication operations corresponding to the first to N-th time periods.

The first to N-th secondary coefficients may be determined by elements constituting a specific row or specific column of a Walsh matrix having a size of N×N.

The plurality of synchronization signal sections may have different lengths in time domain, and the generating of the one or more synchronization signal parts may comprise: classifying the plurality of synchronization signal sections into first to M-th part groups; generating first to M-th synchronization signal part bundles by concatenating one or more synchronization signal sections included in each of the first to M-th part groups in time domain; and generating the one or more synchronization signal parts based on a sum operation of the first to M-th synchronization signal part bundles, wherein M is a natural number greater than 1.

The one or more synchronization signals may include one first synchronization signal, and the generating of the one or more synchronization signals may comprise: concatenating all of the one or more synchronization signal parts without overlapping in time domain to generate the first synchronization signal.

A number of the one or more synchronization signals may be K, the first to K-th synchronization signals generated based on the generating of the one or more synchronization signals may constitute a first synchronization signal set, and K may be a natural number.

The one or more synchronization signal parts may include first to N-th synchronization signal parts, the one or more synchronization signals may include one second synchronization signal, and the generating of the one or more synchronization signals may comprise: generating the second synchronization signal by concatenating the first to N-th synchronization signal parts in time domain, wherein in the generating of the second synchronization signal, at least some of the first to N-th synchronization signal parts are concatenated so that at least part thereof overlap with each other, and N is a natural number greater than 1.

According to a second exemplary embodiment of the present disclosure, a first communication apparatus may comprise a processor, and the processor may cause the first communication apparatus to perform: identifying one or more synchronization signal components constituting a synchronization signal component set; generating a plurality of synchronization signal sections based on the one or more synchronization signal components and a plurality of primary coefficients corresponding to the one or more synchronization signal components; generating one or more synchronization signal parts based on a combination of the plurality of synchronization signal sections; generating one or more synchronization signals based on a combination of the one or more synchronization signal parts in time domain; and transmitting the generated one or more synchronization signals.

The synchronization signal component set may have J synchronization signal components as elements, and in the generating of the plurality of synchronization signal sections, the processor may further cause the first communication apparatus to perform: determining a first synchronization signal component matrix using the J synchronization signal components; determining a first primary coefficient matrix having a same size as the first synchronization signal component matrix and composed of the plurality of primary coefficients; and generating the plurality of synchronization signal sections by multiplying elements corresponding to each other in the first synchronization signal component matrix and the first primary coefficient matrix, wherein J is a natural number equal to or greater than 1.

Each of the plurality of synchronization signal sections may correspond to one of first to N-th time periods distinguished from each other in time domain, and in the generating of the one or more synchronization signal parts, the processor may further cause the first communication apparatus to perform: performing a sum operation for synchronization signal sections corresponding to each of the first to N-th time periods among the plurality of synchronization signal sections, with respect to each of the first to N-th time periods; and generating first to N-th synchronization signal parts respectively corresponding to the first to N th time periods, based on results of the sum operations corresponding to the first to N-th time periods, wherein N is a natural number equal to or greater than 1.

In the generating of the first to N-th synchronization signal parts, the processor may further cause the first communication apparatus to perform: identifying first to N-th secondary coefficients respectively corresponding to the first to N-th time periods; performing a multiplication operation between the result of the sum operation corresponding to each of the first to N-th time periods and the first to N-th secondary coefficients corresponding to each of the first to N-th time periods; and obtaining the first to N-th synchronization signal parts respectively corresponding to results of the multiplication operations corresponding to the first to N-th time periods.

The plurality of synchronization signal sections may have different lengths in time domain, and in the generating of the one or more synchronization signal parts, the processor may further cause the first communication apparatus to perform: classifying the plurality of synchronization signal sections into first to M-th part groups; generating first to M-th synchronization signal part bundles by concatenating one or more synchronization signal sections included in each of the first to M-th part groups in time domain; and generating the one or more synchronization signal parts based on a sum operation of the first to M-th synchronization signal part bundles, wherein M is a natural number greater than 1.

The one or more synchronization signals may include one first synchronization signal, and in the generating of the one or more synchronization signals, the processor may further cause the first communication apparatus to perform: concatenating all of the one or more synchronization signal parts without overlapping in time domain to generate the first synchronization signal.

A number of the one or more synchronization signals may be K, the first to K-th synchronization signals generated based on the generating of the one or more synchronization signals may constitute a first synchronization signal set, and K may be a natural number.

The one or more synchronization signal parts may include first to N-th synchronization signal parts, the one or more synchronization signals may include one second synchronization signal, and in the generating of the one or more synchronization signals, the processor may further cause the first communication apparatus to perform: generating the second synchronization signal by concatenating the first to N-th synchronization signal parts in time domain, wherein in the generating of the second synchronization signal, at least some of the first to N-th synchronization signal parts are concatenated so that at least part thereof overlap with each other, and N is a natural number greater than 1.

According to a third exemplary embodiment of the present disclosure, an operation method of a first communication apparatus may comprise: receiving one or more synchronization signals transmitted from a second communication apparatus; and obtaining synchronization information corresponding to the second communication apparatus based on the one or more synchronization signals, wherein the one or more synchronization signals may be generated at the second communication apparatus based on a combination of one or more synchronization signal parts in time domain, the one or more synchronization signal parts may be generated at the second communication apparatus based on a combination of a plurality of synchronization signal sections, and the plurality of synchronization signal sections may be generated at the second communication apparatus based on one or more synchronization signal components constituting a synchronization signal component set and a plurality of primary coefficients corresponding to the one or more synchronization signal components.

The synchronization signal component set may have J synchronization signal components as elements, the plurality of synchronization signal sections may be generated at the second communication apparatus by multiplying elements corresponding to each other in a first synchronization signal component matrix and a first primary coefficient matrix, the first synchronization signal component matrix may be determined based on the J synchronization signal components, the first primary coefficient matrix may be composed of the plurality of primary coefficients, J may be a natural number equal to or greater than 1, and the first synchronization signal component matrix and the first primary coefficient matrix may have same sizes.

Each of the plurality of synchronization signal sections may correspond to one of first to N-th time periods distinguished from each other in time domain, the one or more synchronization signal parts may be first to N-th synchronization signal parts respectively corresponding to the first to N th time periods, and the first to N-th synchronization signal parts may be generated based on based on results of sum operations for synchronization signal sections corresponding to each of the first to N-th time periods among the plurality of synchronization signal sections.

According to exemplary embodiments of a method and an apparatus for transmitting/receiving a synchronization signal having a layered structure in a communication system, a transmitting device may generate and transmit a synchronization signal (hereinafter, 'layered synchronization signal') having a layered structure (or multi-layer structure). The layered synchronization signal may be generated based on a synchronization signal component set composed of one or more types of synchronization signals (hereinafter referred to as 'synchronization signal components'). The transmitting device may generate the layered synchronization signal based on a combination (e.g., linear combination) of one or more synchronization signal components included in the synchronization signal component set. The layered synchronization signal generated as described above can simultaneously have the advantages of several types of synchronization signals. The layered synchronization signal generated as described above may have improved synchronization performance and/or estimation performance. The layered synchronization signal generated as described above may also have low implementation complexity, depending on the design.

DETAILED DESCRIPTION OF THE EMBODIMENTS

Figure 1:
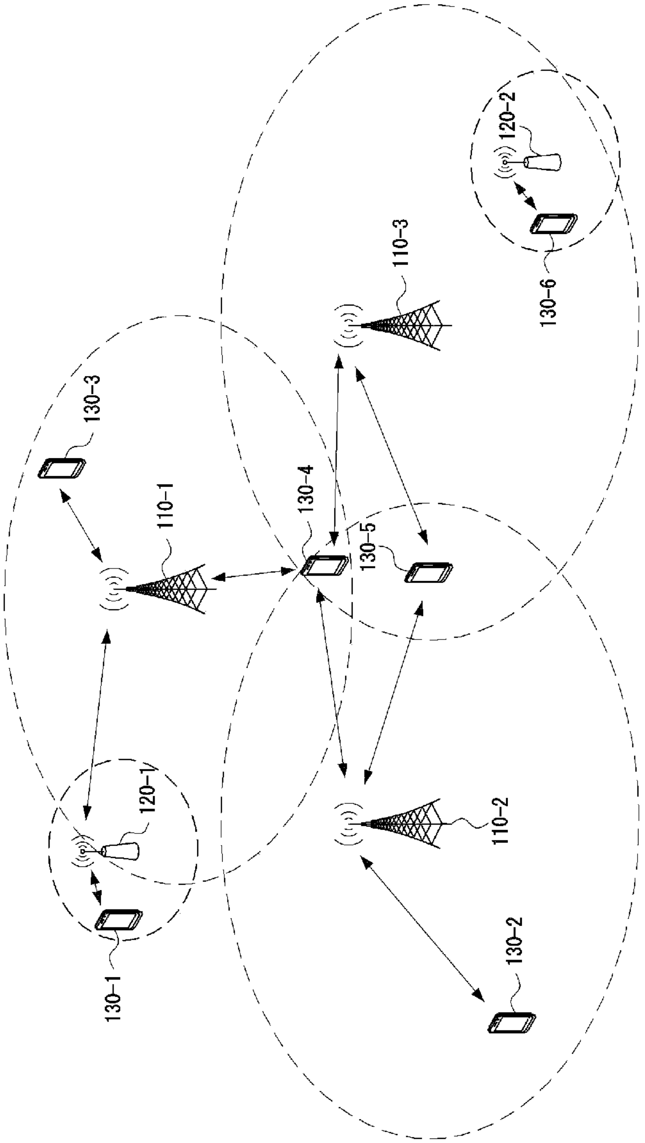
FIG. 1 is a conceptual diagram illustrating an exemplary embodiment of a communication system.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., “between” versus “directly between,” “adjacent” versus “directly adjacent,” etc.).

The terminology used herein is for the purpose of describing particular exemplary embodiments only and is not intended to be limiting of the present disclosure. As used herein, the singular forms “a,” “an” and “the” are intended to include the plural forms as well, unless the context clearly indicates otherwise. It will be further understood that the terms “comprises,” “comprising,” “includes” and/or “including,” when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present disclosure, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating an exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
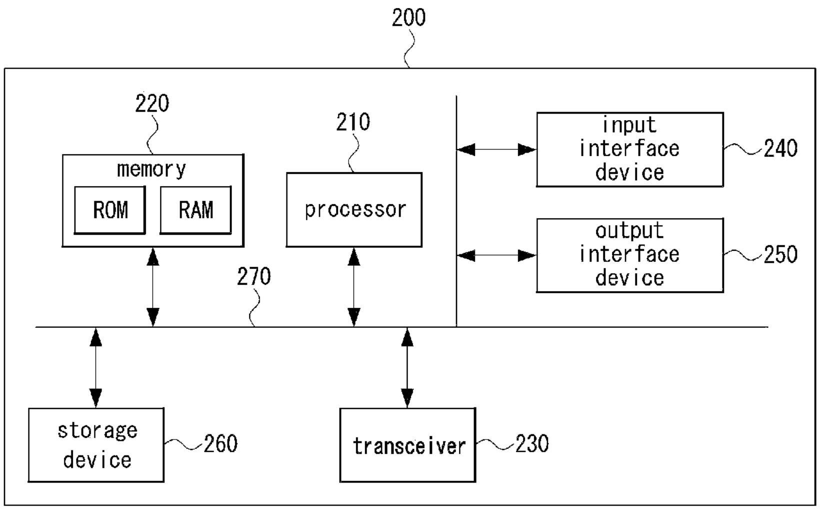
FIG. 2 is a block diagram illustrating an exemplary embodiment of a communication node constituting a communication system.

FIG. 2 is a block diagram illustrating an exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods for transmission and reception of synchronization signal in a communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a receiving node is described, a corresponding transmitting node may perform an operation corresponding to the operation of the receiving node. Conversely, when an operation of a transmitting node is described, a corresponding receiving node may perform an operation corresponding to the operation of the transmitting node.

Figure 3:
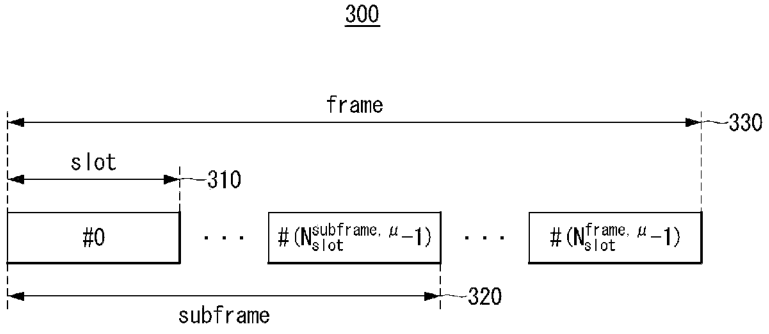
FIG. 3 is a conceptual diagram illustrating an exemplary embodiment of a structure of a radio frame in a communication system.

FIG. 3 is a conceptual diagram illustrating an exemplary embodiment of a structure of a radio frame in a communication system.

Referring to FIG. 3, in the communication system, one radio frame may consist of 10 subframes, and one subframe may consist of 2 time slots. One time slot may have a plurality of symbols in the time domain and may include a plurality of subcarriers in the frequency domain. The plurality of symbols in the time domain may be OFDM symbols. For convenience, an exemplary embodiment of a radio frame structure in the communication system will be described below using an OFDM transmission mode in which the plurality of symbols in the time domain are OFDM symbols as an example. However, this is only an example for convenience of description, and exemplary embodiments of the radio frame structure in the communication system are not limited thereto. For example, various exemplary embodiments of the radio frame structure in the communication system may be configured to support other transmission modes, such as a single carrier (SC) transmission mode.

In a communication system to which the 5G communication technology, etc. is applied, one or more of numerologies of Table 1 may be used in accordance with various purposes, such as inter-carrier interference (ICI) reduction according to frequency band characteristics, latency reduction according to service characteristics, and the like.

TABLE 1

| $\mu$ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Table 1 is only an example for convenience of description, and exemplary embodiments of numerologies used in the communication system may not be limited thereto. Each numerology $\mu$ may correspond to information of a subcarrier spacing (SCS) $\Delta f$ and a cyclic prefix (CP). The terminal may identify values of the numerology $\mu$ and CP applied to a downlink bandwidth part or uplink bandwidth part based on higher layer parameters such as 'subcarrierSpacing' and 'cyclicPrefix'.

Time resources in which radio signals are transmitted in a communication system 300 may be represented with a frame 320 comprising one or more $$\left(N_{slot}^{frame,\mu}/N_{slot}^{subframe,\mu}\right)$$

subframes, a subframe 320 comprising one or more $$\left(N_{slot}^{subframe,\mu}\right)$$

slots, and a slot 310 comprising 14

$$\left(N_{symb}^{slot}\right)$$

OFDM symbols. In this case, according to a configured numerology, as the values of $$N_{symb}^{slot},\ N_{slot}^{subframe,\mu},\ \text{and}\ N_{slot}^{frame,\mu},$$

values according to Table 2 below may be used in case of a normal CP, and values according to Table 3 below may be used in case of an extended CP. The OFDM symbols included within one slot may be classified into 'downlink', 'flexible', or 'uplink' by higher layer signaling or a combination of higher layer signaling and L1 signaling.

TABLE 2

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

In an exemplary embodiment of a communication system, the frame 330 may have a length of 10 ms, and the subframe 320 may have a length of 1 ms. Each frame 330 may be divided into two half-frames having the same length, and the first half-frame (i.e., half-frame 0) may be composed of subframes #0 to #4, and the second half-frame (i.e., half-frame 1) may be composed of subframes #5 to #9. One carrier may include a set of frames for uplink (i.e., uplink frames) and a set of frames for downlink (i.e., downlink frames).

One slot may have 6 (i.e., extended cyclic prefix (CP) case) or 7 (i.e., normal CP case) OFDM symbols. A time-frequency region defined by one slot may be referred to as a resource block (RB). When one slot has 7 OFDM symbols, one subframe may have 14 OFDM symbols (i.e., 1=0, 1, 2, . . . , 13).

The subframe may be divided into a control region and a data region. A physical downlink control channel (PDCCH) may be allocated to the control region. A physical downlink shared channel (PDSCH) may be allocated to the data region. Some of the subframes may be special subframes. The special subframe may include a downlink pilot time slot (DwPTS), a guard period (GP), and an uplink pilot time slot (UpPTS). The DwPTS may be used for time and frequency synchronization estimation and cell search of the terminal. The GP may be a period for avoiding interferences caused by multipath delays of downlink signals.

In an exemplary embodiment of a communication system, in order to access a radio network, a user may perform serving cell identification after acquiring time/frequency synchronization with the network. Operations such as synchronization acquisition and serving cell identification may be performed based on a synchronization signal. Here, the synchronization signal may correspond to a primary synchronization signal (PSS), a secondary synchronization signal (SSS), or a synchronization signal block (SSB) composed of the PSS and SSS.

In an exemplary embodiment of the communication system, the synchronization signal may be used to acquire time synchronization and/or frequency synchronization between a transmitting device and a receiving device. Meanwhile, the synchronization signal may be used for distance estimation using a transmission delay time, for distinguishing between a plurality of transmitting devices, or for estimating a radio channel between two radio communication devices. The synchronization signal may be generated in a variety of manners. The performance of each of the synchronization signals generated in various manners may be superior or inferior depending on a communication situation, communication environment, purpose, and the like. A synchronization signal transmission/reception technique that exhibits excellent performance of a synchronization operation and/or estimation operation based on the synchronization signal in various communication situations, communication environments, and uses may be required.

In an exemplary embodiment of the communication system, a synchronization signal may be configured based on one or more sequences. The one or more sequences constituting the synchronization signal may be arranged in the frame 330, subframe 320, slot 310, or OFDM symbols constituting the slot 310 in the time domain. Meanwhile, the one or more sequences constituting the synchronization signal may be modulated and mapped to a plurality of subcarriers in the frequency domain. In an exemplary embodiment of the communication system, the one or more sequences constituting the synchronization signal may correspond to one or more binary sequences or complex sequences.

Figure 4A:
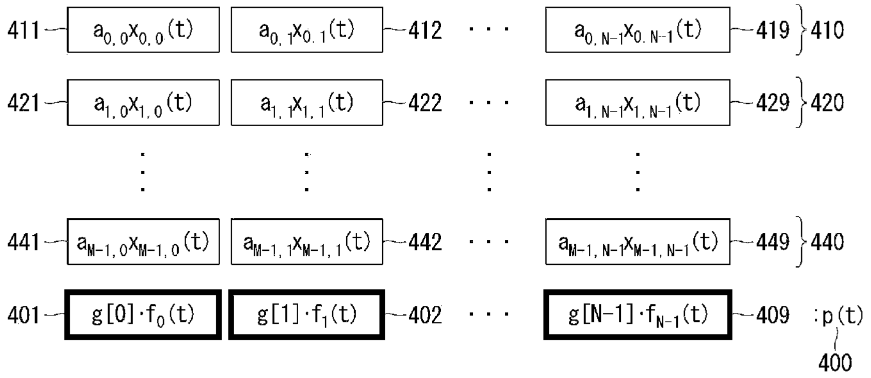
FIGS. 4A and 4B are conceptual diagrams for describing first and second exemplary embodiments of a synchronization signal.
Figure 4B:
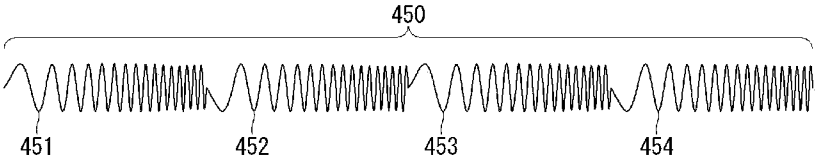

FIGS. 4A and 4B are conceptual diagrams for describing first and second exemplary embodiments of a synchronization signal.

In the communication system, the synchronization signal may be generated in a variety of manner. Here, the synchronization signal may be the same as or similar to the synchronization signal described with reference to FIG. 3. In an exemplary embodiment of the communication system, the synchronization signal may be generated based on an analog scheme. The synchronization signal generated based on an analog scheme (hereinafter referred to as 'analog synchronization signal') may be configured with a simple pulse signal or chirp signal. When the analog synchronization signal is used, a transmission/reception time of the synchronization signal may be easily estimated. On the other hand, when the analog synchronization signal is used, it may not be easy to identify (or distinguish) a specific transmission device that has transmitted the synchronization signal among a plurality of radio communication devices existing in a communication environment.

In another exemplary embodiment of the communication system, the synchronization signal may be generated based on a digital scheme. When the synchronization signal generated based on a digital scheme (hereinafter referred to as 'digital synchronization signal') is used, a transmission/reception time of the synchronization signal may be easily estimated. When the digital synchronization signal is used, a specific transmission device that has transmitted the synchronization signal among a plurality of radio communication devices existing in a communication environment may be easily identified. For example, in the communication system, a plurality of synchronization signals may be allocated to a plurality of base stations, respectively, but the same synchronization signal may not be allocated to base stations located adjacently to each other. Through this, a user terminal receiving a synchronization signal transmitted from each base station may identify the base station that transmitted the received synchronization signal.

As the functions and uses of synchronization signals vary, indicators for evaluating the characteristics of synchronization signals may also vary. It may not be easy for a particular synchronization signal to be evaluated consistently as good based on various metrics. For example, an exemplary embodiment of the synchronization signal may have excellent synchronization estimation performance, but may have a disadvantage in that implementation complexity is high or a lot of radio resources are required. Another exemplary embodiment of the synchronization signal may have excellent performance in a relatively noise-free radio channel environment, but performance thereof may be significantly degraded in a noisy radio channel or a multi-path radio channel environment with severe fading. Another exemplary embodiment of the synchronization signal may have good synchronization estimation performance but poor radio channel estimation performance.

In an exemplary embodiment of the communication system, a synchronization signal may be generated by passing a mathematical sequence or a digital sequence through a pulse shaping filter. The synchronization signal generated as described above may have excellent auto-correlation characteristics and excellent cross-correlation characteristics. When the synchronization signal is generated as described above, the network may easily generate a synchronization signal set including a relatively large number of elements. For example, in an exemplary embodiment of the communication system, the number of PSS may be three, and the number of SSS may be 1008. By using such digital sequences or digital synchronization signals as elements to generate synchronization signals, a variety of synchronization signals may be readily generated. Such the synchronization signal generation scheme may have a relatively high degree of design freedom. For example, the network may select a longer sequence to improve the performance of the synchronization signal or use a binary sequence rather than a complex sequence to reduce implementation complexity. For generation of the synchronization signal, an m-sequence, Zadoff-Chu sequence, Gold sequence, and/or the like may be used. A receiving device receiving the digital synchronization signal may process the received synchronization signal in the digital domain in order to perform an operation such as time and/or frequency synchronization estimation. The complexity of a synchronization signal processing unit (or synchronization signal processing operation) that processes the digital synchronization signal may be determined based on various factors. For example, the complexity of the synchronization signal processing unit processing the digital synchronization signal may be determined based on factors such as the length of the used sequence, the number of elements constituting the synchronization signal set, and a used bandwidth. In order to support the synchronization signal having high performance, there may be a problem in that the complexity of the synchronization signal processing unit (or synchronization signal processing operation) of the receiving device increases.

A target performance (or performance target) of the synchronization signal may be determined based on system requirements (or service requirements). Once the target performance is determined, the degree of freedom in designing the synchronization signal may be significantly limited. For example, when the system requirements and/or target performance are determined, such as a used bandwidth, implementation complexity, transmission distance, power consumption, interference between devices, and various functions to be processed by the synchronization signal, only a type of synchronization signal having characteristics that satisfy the determined requirements may be selected. For example, when the synchronization signal is generated based on a Zadoff-Chu sequence in an exemplary embodiment of the communication system, the generated synchronization signal may inherit characteristics of the Zadoff-Chu sequence. The synchronization signal generated based on the Zadoff-Chu sequence as described above may have an advantage of excellent cross-correlation characteristics. On the other hand, the synchronization signal generated based on the Zadoff-Chu sequence may have disadvantages in that it is vulnerable to a carrier frequency offset (CFO) and has a rather high implementation complexity. In another exemplary embodiment of the communication system, when the synchronization signal is generated based on a chirp signal, the generated synchronization signal may inherit characteristics of the chirp signal. The synchronization signal generated based on the chirp signal may have an advantage of excellent auto-correlation characteristics. On the other hand, the synchronization signal generated based on the chirp signal may not have flexibility in design and functions supported by the sequence-based synchronization signals.

Referring to FIGS. 4A and 4B, a synchronization signal may be generated to have a layered structure (or multi-layer structure). Hereinafter, in the present disclosure, a 'synchronization signal having a layered (or multi-layer) structure' may be referred to as 'layered synchronization signal'.

The layered synchronization signal may be generated based on a 'synchronization signal component set' composed of one or more types of synchronization signal components. The synchronization signal component set may be denoted by an alphabet, 'Λ', or the like. The network may generate a synchronization signal by using at least some of the synchronization signal components of one or more types, which constitute the synchronization signal component set Λ.

Each of one or more types of synchronization signal components constituting the synchronization signal component set may be an analog signal (e.g., pulse signal, chirp signal, or the like). Each of one or more types of synchronization signal components constituting the synchronization component set may be a digital signal. Each of one or more types of synchronization signal components constituting the synchronization signal component set may be a signal obtained by converting a mathematical sequence into an analog signal based on a pulse shaping filter. For example, the synchronization signal component set may include, as an element, a signal obtained by mapping a mathematical sequence to subcarriers of an OFDM symbol in the frequency domain, and transforming it into the time domain through inverse discrete Fourier transform (IDFT). The synchronization signal component set may include, as an element, a signal generated based on another synchronization signal component set. The synchronization signal component set A may include other signals generated in various manners.

The synchronization signal component set A may be expressed identically or similarly to Equation 1.

$$\Lambda = \{s_a(t) | a = 0, 1, \ldots, N_\Lambda - 1\} \quad \text{[Equation 1]}$$

In Equation 1, $s_a(t)$ may refer to each of the elements (i.e., synchronization signal components) constituting the synchronization signal component set. $N_\Lambda$ may be a natural number indicating the number of elements constituting the synchronization signal component set. The synchronization signal component set may have different signals as elements. For example, the synchronization signal component set may have pulse signal(s) and chirp signal(s) as elements at the same time. Alternatively, the synchronization signal component set may have chirp signal(s) and Zadoff-Chu sequence signal(s) as elements at the same time. Alternatively, the synchronization signal component set may have m-sequence signal(s) and Zadoff-Chu sequence signal(s) as elements at the same time.

A synchronization signal may be generated based on the synchronization signal component set Λ. Here, the synchronization signal component set Λ may include a matrix X as an element. Here, the size of the matrix X may be (M×N), and M and N may be natural numbers. Alternatively, the synchronization signal component set Λ may include a synchronization signal component $x_{m,n}(t)$ as an element, and the matrix X may be defined based on $x_{m,n}(t)$. Here, m and n may be natural numbers, may be defined as $0 \le m \le M-1$ and $0 \le n \le N-1$. The synchronization signal component set Λ may include a vector g as an element. Here, the size of the vector g may be (1×N). Alternatively, the synchronization signal component set Λ may include g[n] as an element, and the vector g may be defined based on g[n]. The synchronization signal component set Λ may include a matrix A having a size of (M×N) as an element. Here, the size of the matrix A may be (M×N). Alternatively, the synchronization signal component set Λ may include $a_{m,n}$ as an element, and the matrix A may be defined based on $a_{m,n}$. Here, $a_{m,n}$ and/or $x_{m,n}$ may be coefficients that determine a combination scheme of the synchronization signal component $x_{m,n}(t)$ for generating a synchronization signal.

In the present disclosure, for convenience of description, when a specific matrix (or specific vector, etc.) is defined based on specific components included in the synchronization signal component set Λ, the synchronization signal component set Λ may be expressed as including the corresponding matrix (or corresponding vector, etc.) as an element. For example, when the synchronization signal component set Λ includes $r_{m,n}$ as an element and a matrix R is defined based on $r_{m,n}$, the synchronization signal component set Λ may be expressed as including the matrix R as an element.

Referring to FIG. 4A, a synchronization signal p(t) 400 according to the first exemplary embodiment of the synchronization signal may be generated as a layered synchronization signal. A synchronization signal part $a_{m,n} \cdot x_{m,n}(t)$ may be generated by multiplying the synchronization signal component $x_{m,n}(t)$ and the corresponding coefficient $a_{m,n}(t)$. As one or more synchronization signal sections are combined, one or more synchronization signal parts may be generated. The synchronization signal p(t) 400 may be generated by concatenating one or more synchronization signal parts $g[n] \cdot f_n(t)$ $(0 \le n \le N-1)$ expressed as in Equation 2 in series in the time domain.

$$g[0] \cdot f_0(t), g[1] \cdot f_1(t), \ldots g[N-1] \cdot f_{N-1}(t) \quad \text{[Equation 2]}$$

The synchronization signal p(t) 400 may be generated by concatenating synchronization signal parts $g[0] \cdot f_0(t)$ 401, $g[1] \cdot f_1(t)$ 402, . . . , and $g[N-1] \cdot f_{N-1}(t)$ 409 in series in the time domain. The synchronization signal p(t) 400 may be expressed identically or similarly to Equation 3.

$$p(t) = \sum_{n=0}^{N-1} g[n] \cdot f_n(t - nT_K) \quad \text{[Equation 3]}$$

Referring to Equation 3, the synchronization signal p(t) 400 may be defined as a value obtained by combining synchronization signal parts $g[n] \cdot f_n(t)$ from n=0 to n=N−1. Here, g[n] may constitute the vector g. Meanwhile, $f_n(t)$ may be defined identically or similarly to Equation 4.

$$f_n(t) = \sum_{m=0}^{M-1} a_{m,n} x_{m,n}(t), \quad x_{m,n} \in \Lambda \quad \text{[Equation 4]}$$

Referring to Equation 4, $f_n(t)$ may be defined as a value obtained by summing synchronization signal sections $a_{m,n} \cdot x_{m,n}(t)$ from m=0 to m=M−1. Here, $a_{m,n}$ may constitute the matrix A, and $x_{m,n}(t)$ may constitute the matrix X.

In FIG. 4A, $f_0(t)$, $f_1(t)$, . . . , and $f_{N-1}(t)$ of the synchronization signal parts 401, 402, . . . , and 409 may be generated based on a sum of the synchronization signal sections $a_{m,n} \cdot x_{m,n}(t)$ 410, 420, . . . , and 440. Specifically, $f_0(t)$ of the first synchronization signal part 401 may be determined based on a sum of the synchronization signal sections $a_{0,0} \cdot x_{0,0}(t)$ 411, $a_{1,0} \cdot x_{1,0}(t)$ 421, . . . , and $a_{M-1,0} \cdot x_{M-1,0}(t)$ 441. $f_1(t)$ of the second synchronization signal part 402 may be determined based on a sum of the synchronization signal sections $a_{0,1} \cdot x_{0,1}(t)$ 412, $a_{1,1} \cdot x_{1,1}(t)$ 422, . . . , and $a_{M-1,1} \cdot x_{M-1,1}(t)$ 442. $f_{N-1}(t)$ of the N-th synchronization signal part 409 may be determined based on a sum of the synchronization signal sections $a_{0,N-1} \cdot x_{0,N-1}(t)$ 419, $a_{1,N-1} \cdot x_{1,N-1}(t)$ 429, . . . , and $a_{M-1,N-1} \cdot x_{M-1,N-1}(t)$ 449.

Referring to Equations 3 and 4, the synchronization signal p(t) 400 may be defined based on g[n] constituting the vector g, $a_{m,n}$ constituting the matrix A, and $x_{m,n}(t)$ constituting the matrix X. The vector g, matrix A, and matrix X may be expressed as Equation 5.

$$g = [g[0] \;\; g[1] \;\; \ldots \;\; g[N-1]] \quad \text{[Equation 5]}$$

$$A = \begin{bmatrix} a_{0,0} & a_{0,1} & \cdots & a_{0,N-1} \\ a_{1,0} & a_{1,1} & \cdots & a_{1,N-1} \\ \vdots & \vdots & \ddots & \vdots \\ a_{M-1,0} & a_{M-1,1} & \cdots & a_{M-1,N-1} \end{bmatrix}$$

$$X = \begin{bmatrix} x_{0,0}(t) & x_{0,1}(t) & \cdots & x_{0,N-1}(t) \\ x_{1,0}(t) & x_{1,1}(t) & \cdots & x_{1,N-1}(t) \\ \vdots & \vdots & \ddots & \vdots \\ x_{M-1,0}(t) & x_{M-1,1}(t) & \cdots & x_{M-1,N-1}(t) \end{bmatrix}$$

The synchronization signal component set Λ may include the vector g, matrix A, and/or matrix X as elements. When the synchronization signal component set Λ is given and the vector g, matrix A and matrix X are determined, the synchronization signal p(t) 400 may be determined. The process of generating the synchronization signal p(t) 400 may be expressed as Equation 6.

$$\{g, A, X | \Lambda\} \mapsto p(t) \quad \text{[Equation 6]}$$

In the present disclosure, if there is no confusion in context, based on Equation 6, {g, A, X|Λ} may be interpreted as having the same meaning as p(t).

Even if the same synchronization signal component set Λ is given, the synchronization signal p(t) 400 may be determined differently according to the vector g, matrix A, and matrix X. For example, a synchronization signal $p_1(t)$ and a synchronization signal $p_2(t)$ may be generated based on the same synchronization signal component set Λ. The synchronization signal $p_1(t)$ may be determined based on a vector $g_1$, matrix $A_1$, and matrix $X_1$. The synchronization signal $p_2(t)$ may be determined based on a vector $g_2$, matrix $A_2$, and matrix $X_2$. This may be expressed as Equation 7.

$$\{g_1, A_1, X_1 | \Lambda\} \mapsto p_1(t) \quad \text{[Equation 7]}$$
$$\{g_2, A_2, X_2 | \Lambda\} \mapsto p_2(t)$$

If the vector $g_1$ and the vector $g_2$ are equal to each other, the matrix $A_1$ and the matrix $A_2$ are equal to each other, and the matrix $X_1$ and the matrix $X_2$ are equal to each other, the synchronization signal $p_1(t)$ and the synchronization signal $p_2(t)$ may be determined to be equal to each other. This may be expressed as Equation 8.

$$(g_1 = g_2) \wedge (A_1 = A_2) \wedge (X_1 = X_2) \Rightarrow p_1(t) = p_2(t) \quad \text{[Equation 8]}$$

In Equation 8, '$\wedge$' may be a logical operator meaning 'and (AND)'.

On the other hand, if the vector $g_1$ and the vector $g_2$ are different from each other, the matrix $A_1$ and the matrix $A_2$ are different from each other, or the matrix $X_1$ and the matrix $X_2$ are different from each other, the synchronization signal $p_1(t)$ and the synchronization signal $p_2(t)$ may be determined to be different from each other. This may be expressed as Equation 9.

$$(g_1 \neq g_2) \vee (A_1 \neq A_2) \vee (X_1 \neq X_2) \Rightarrow p_1(t) \neq p_2(t) \quad \text{[Equation 9]}$$

In Equation 9, '$\vee$' may be a logical operator meaning 'or (OR)'. Equation 9 may be expressed as Equation 10.

$$\{g_1, A_1, X_1 | \Lambda\} \mapsto p_1(t) \neq \{g_2, A_2, X_2 | \Lambda\} \mapsto p_2(t) \quad \text{[Equation 10]}$$

As in Equation 9 or Equation 10, even when the same synchronization signal component set Λ is given, if at least some of the vectors and matrixes underlying the synchronization signals are determined to be different from each other, the synchronization signals may be determined to be different from each other. That is, even on the part of the same synchronization signal component set Λ, the synchronization signals may be configured variously by changing at least some of the vector g, matrix A, and matrix X.

The elements g[n] (n=0, 1, . . . , N−1) constituting the vector g may be variously selected or determined according to the characteristics and purpose of the synchronization signal. For example, the vector g may be generated based on a row or column of a Walsh matrix. On the other hand, the vector g may be generated based on an m-sequence or Zadoff-Chu sequence.

Referring to FIG. 4B, a synchronization signal 450 according to the second exemplary embodiment of the synchronization signal may be generated as a layered synchronization signal. The synchronization signal 450 may be the same as or similar to the synchronization signal 400 according to the first exemplary embodiment described with reference to FIG. 4A. The synchronization signal 450 may be generated based on at least part of Equations 1 to 10.

In the exemplary embodiment shown in FIG. 4B, M=1 and N=4. However, this is only an example for convenience of description, and the second exemplary embodiment of the synchronization signal is not limited thereto. When M=1 and N=4, Equation 5 may be expressed as Equation 11.

$$g=[g[0]\ \ g[1]\ \ g[2]\ \ g[3]] \qquad \text{[Equation 11]}$$
$$A=[a_{0,0}\ \ a_{0,1}\ \ a_{0,2}\ \ a_{0,3}]$$
$$x=[x_{0,0}(t)\ \ x_{0,1}(t)\ \ x_{0,2}(t)\ \ x_{0,3}(t)]$$

Specifically, in the exemplary embodiment shown in FIG. 4B, the vector g, the matrix A, the matrix X, and the synchronization signal component set Λ may be expressed as Equation 12.

$$g=[+1\ \ -1\ \ +1\ \ -1] \qquad \text{[Equation 12]}$$
$$A=[+1\ \ +1\ \ +1\ \ +1]$$
$$x=[x(t)\ \ x(t)\ \ x(t)\ \ x(t)]$$
$$\Lambda=\{x(t)\}$$

Referring to Equation 12, the synchronization signal component set Λ may include only one signal x(t) as an element. The signal x(t) may be a chirp signal. The signal x(t) may be a chirp signal whose frequency linearly increases with time in a specific time period (e.g., $0 \le t < T_K$). The signal x(t) may be defined as in Equation 13.

$$x(t)=\sin\left(2\pi\left(\frac{f_1-f_0}{2T_K}t^2+f_0t\right)\right),\quad 0\le t<T_K \qquad \text{[Equation 13]}$$

The synchronization signal 450 may be generated by concatenating x(t) 451, −x(t) 452, x (t) 453, and −x(t) 454 generated based on the vector g, matrix A, and matrix X in series in the time domain.

Figure 5A:
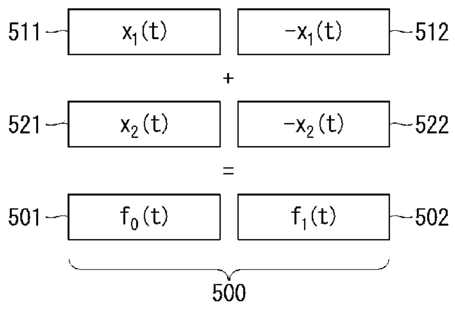
FIGS. 5A to 5C are conceptual diagrams for describing third to fifth exemplary embodiments of a synchronization signal.
Figure 5B:
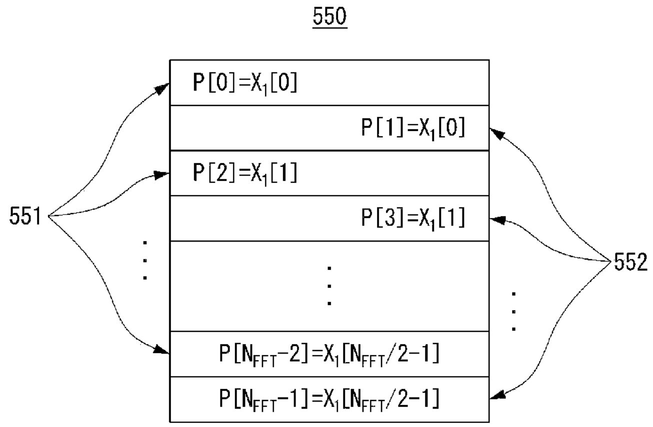
Figure 5C:
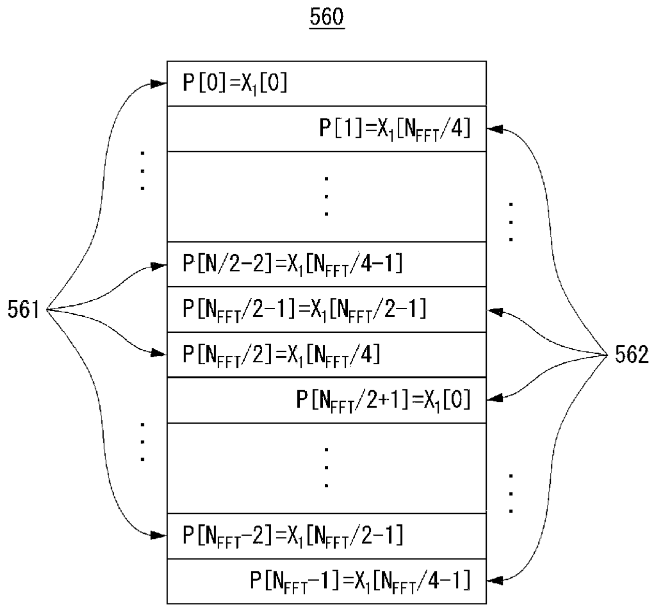

FIGS. 5A to 5C are conceptual diagrams for describing third to fifth exemplary embodiments of a synchronization signal.

Referring to FIGS. 5A to 5C, synchronization signals 500, 550, and 560 according to the third to fifth exemplary embodiments of the synchronization signal may be generated as layered synchronization signals. Hereinafter, in describing the third to fifth exemplary embodiments of the synchronization signal with reference to FIGS. 5A to 5C, descriptions overlapping those described with reference to FIGS. 1 to 4B may be omitted.

Referring to FIG. 5A, the synchronization signal 500 according to the third exemplary embodiment of the synchronization signal may be the same as or similar to the synchronization signal 400 according to the first exemplary embodiment described with reference to FIG. 4A. In the exemplary embodiment shown in FIG. 5A, M and N may be defined as M=2 and N=2. However, this is only an example for convenience of description, and the third exemplary embodiment of the synchronization signal is not limited thereto. When M=2 and N=2, Equation 5 may be expressed as Equation 14.

$$g=[g[0]\ \ g[1]] \qquad \text{[Equation 14]}$$
$$A=\begin{bmatrix} a_{0,0} & a_{0,1} \\ a_{1,0} & a_{1,1} \end{bmatrix}$$
$$X=\begin{bmatrix} x_{0,0}(t) & x_{0,1}(t) \\ x_{1,0}(t) & x_{1,1}(t) \end{bmatrix}$$

Specifically, in the exemplary embodiment shown in FIG. 5A, the vector g, matrix A, matrix X, and synchronization signal component set Λ may be expressed as Equation 15.

$$g=[1\ \ 1] \qquad \text{[Equation 15]}$$
$$A=\begin{bmatrix} +1 & +1 \\ +1 & -1 \end{bmatrix}$$
$$X=\begin{bmatrix} x_1(t) & x_1(t) \\ x_2(t) & x_2(t) \end{bmatrix}$$
$$\Lambda=\{x_1(t),\ x_2(t)\}$$

Referring to Equation 15, the synchronization signal 500 may be generated based on synchronization signal components $x_1(t)$ and $x_2(t)$, which are elements of the synchronization signal component set Λ. Here, $x_1(t)$ may be a signal defined in a specific time period (e.g., $0 \le t < T_K$). Meanwhile, $x_2(t)$ may be defined based on $x_1(t)$. For example, $x_2(t)$ may be defined identically or similarly to Equation 16.

$$x_2(t)=x_1(t)\cdot e^{j2\pi\Delta ft},\ 0\le t<T_K \qquad \text{[Equation 16]}$$

The synchronization signal p(t) 500 may be generated by concatenating or combining a synchronization signal part $f_0(t)$ 510 that is a sum of synchronization signal sections $x_1(t)$ 511 and $x_2(t)$ 512 generated based on the vector g, matrix A, matrix X, and the like, and a synchronization signal part $f_1(t)$ 520 that is a sum of synchronization signal sections $x_2(t)$ 521 and $-x_2(t)$ 522 generated based on the vector g, matrix A, matrix X, and the like.

Referring to FIG. 5B, the synchronization signal 550 according to the fourth exemplary embodiment of the synchronization signal may be generated as a layered synchronization signal. The synchronization signal 550 according to the fourth exemplary embodiment of the synchronization signal may be the same as or similar to the synchronization signal 400 according to the first exemplary embodiment described with reference to FIG. 4A, and the synchronization signal 500 according to the third exemplary embodiment described with reference to FIG. 5A. The synchronization signal 550 may be generated based on at least part of Equations 1 to 10 and 14 to 16.

One or more sequences constituting the synchronization signal 550 may be modulated and mapped to a plurality of subcarriers in the frequency domain. FIG. 5B shows a result of modulating a plurality of components (or sequences) constituting the synchronization signal 550 and mapping them to subcarriers of an OFDM symbol. For example, the synchronization signal 550 may consist of $N_{FFT}$ components. Here, $N_{FFT}$ may be a natural number. The synchronization signal components P[i] (i=0, 1, . . . , $N_{FFT}$) may include components having even indexes (i.e., i=0, 2, 4, . . . , $N_{FFT-2}$) (hereinafter, even-numbered components 551) and components having odd indexes (i.e., i=1, 3, 5, . . . , $N_{FFT-1}$) (hereinafter, odd-numbered components 552). For an integer k greater than or equal to 0, a value of the even-numbered component P[2k] constituting the synchronization signal 550 may be $X_1[k]$. Here, $X_1[k]$ may correspond to the synchronization signal component $x_1(t)$ in the time domain according to the third exemplary embodiment described with reference to FIG. 5A. In other words, the synchronization signal component $x_1(t)$ constituting the synchronization signal 500 in the time domain described with reference to FIG. 5A may correspond to a result of transforming the even-numbered components 551 constituting the synchronization signal 550 in the frequency domain described with reference to FIG. 5B into the time domain through IDFT. Similarly, the synchronization signal component $x_2(t)$ constituting the synchronization signal 500 in the time domain described with reference to FIG. 5A may correspond to a result of transforming the odd-numbered components 552 constituting the synchronization signal 550 in the frequency domain described with reference to FIG. 5B into the time domain through IDFT. As in Equation 16, the synchronization signal components $x_1(t)$ and $x_2(t)$ constituting the synchronization signal 500 in the time domain may have a relationship of $x_2(t)=x_1(t)\cdot e^{j2\pi\Delta ft}$. Here, Δf may be the same as or similar to Equation 17.

$$\Delta f = \frac{1}{T_F} \qquad \text{[Equation 17]}$$

Referring to Equation 17, the odd-numbered component P[2k+1] constituting the synchronization signal 550 in the frequency domain has the same value $X_1[k]$ as the even-numbered component P[2k], but the odd-numbered component P[2k+1] may be regarded as being frequency-shifted by an interval of one subcarrier from the even-numbered component P[2k].

Referring to FIG. 5C, the synchronization signal 560 according to the fifth exemplary embodiment of the synchronization signal may be generated as a layered synchronization signal. The synchronization signal 560 may be the same as or similar to the synchronization signal 400 according to the first exemplary embodiment described with reference to FIG. 4A and the synchronization signal 500 according to the third exemplary embodiment described with reference to FIG. 5A. One or more sequences constituting the synchronization signal 560 may be modulated and mapped to a plurality of subcarriers in the frequency domain. The synchronization signal 560 may consist of $N_{FFT}$ components. The synchronization signal components P[i] may include even-numbered components 561 and odd-numbered components 562. For an integer k greater than or equal to 0, a value of the even-numbered component P[2k] constituting the synchronization signal 560 may be $X_1[k]$. Here, $X_1[k]$ may correspond to the synchronization signal component $x_1(t)$ in the time domain according to the third exemplary embodiment described with reference to FIG. 5A. In other words, the synchronization signal component $x_1(t)$ constituting the synchronization signal 500 in the time domain described with reference to FIG. 5A may correspond to a result of transforming the even-numbered components 561 constituting the synchronization signal 560 in the frequency domain described with reference to FIG. 5C into the time domain through IDFT. Similarly, the synchronization signal component $x_2(t)$ constituting the synchronization signal 500 in the time domain described with reference to FIG. 5A may correspond to a result of transforming the odd-numbered components 562 constituting the synchronization signal 560 in the frequency domain described with reference to FIG. 5C into the time domain through IDFT. As in Equation 16, the synchronization signal components $x_1(t)$ and $x_2(t)$ constituting the synchronization signal 500 in the time domain may have a relationship of $x_2(t)=x_1(t)\cdot e^{j2\pi\Delta ft}$. Here, Δf may be the same as or similar to Equation 18.

$$\Delta f = \frac{N_{FFT}/2 + 1}{T_F} \qquad \text{[Equation 18]}$$

Referring to Equation 18, the odd-numbered component P[2k+1] constituting the synchronization signal 560 in the frequency domain has the same value $X_1[k]$ as the even-numbered component P[2k], but the odd-numbered component P[2k+1] may be regarded as being frequency-shifted by an interval of ($N_{FFT}$/2+1) subcarriers from the even-numbered component P[2k]. For example, a value of the even-numbered component P[0] may be $X_1[0]$. In addition, a value of the odd-numbered component P[$N_{FFT}$/2+1] frequency-shifted by an interval of ($N_{FFT}$/2+1) subcarriers from the even-numbered component P[0] may be $X_1[0]$ identically to the value of the even-numbered component P[0].

In an exemplary embodiment of the communication system, a correlation coefficient $\rho_{xr}(\tau)$ between arbitrary two signals x(t) and r(t) may be defined identically or similarly to Equation 19.

$$\rho_{xr}(\tau) = \frac{\int_t x(t+\tau)r^*(t)dt}{\left(\int_t |x(t)|^2 dt \cdot \int_t |r(t)|^2\right)^{1/2}} \qquad \text{[Equation 19]}$$

Referring to Equation 19, when the two signals x(t) and r(t) are equal to each other, $\rho_{xr}(\tau)$ may be 1 when τ=0.

In an exemplary embodiment of the communication system, if the synchronization signal has a long length in the time domain, it may be more affected by a Doppler shift, CFO, phase noise, and the like. In other words, as the synchronization signal has a shorter length in the time domain, it may have robust characteristics against the Doppler shift, CFO, and phase noise.

In the third to fifth exemplary embodiments of the synchronization signal described with reference to FIGS. 5A to 5C, each of the synchronization signals 500, 550, and 560 may be composed of synchronization signal components shorter than itself. For example, in the third exemplary embodiment of the synchronization signal described with reference to FIG. 5A, the synchronization signal 500 may be composed of a combination of $f_0(t)$ 501 and $f_1(t)$ 502 having shorter lengths than itself in the time domain. Meanwhile, in the fourth and fifth exemplary embodiments of the synchronization signal described with reference to FIGS. 5B and 5C, the synchronization signals 550 and 560 may be composed of relatively short even-numbered components 551 and 561 and odd-numbered components 552 and 562.

In an exemplary embodiment of the communication system, when a synchronization signal transmitted by a transmitting device (hereinafter referred to as 'transmission signal') is denoted by p(t), and a signal received by a receiving device (hereinafter referred to as 'reception signal') is denoted as r(t), a correlation coefficient $\rho_{pr}(\tau)$ between the transmission signal p(t) and the reception signal r(t) may represent characteristics of an output of a synchronization signal detector. When the transmission signal p(t) and the reception signal r(t) are the same, $\rho_{pr}(\tau)$ may be 1 when $\tau=0$. However, the reception signal r(t) may not be the same as the transmission signal p(t) due to influence of the radio channel and implementation limitations of the transceiver. For example, the reception signal r(t) may not be identical to the transmission signal p(t) due to a Doppler shift, CFO, phase noise, and the like between the transmitting and receiving devices, the reception signal r(t) may not be identical to the transmission signal p(t). In this case, $\rho_{pr}(\tau)$ may be smaller than 1 when $\tau=0$.

In an exemplary embodiment of the communication system, the transmit signal p(t) may consist of transmission signal components $x_1(t)$ and $x_2(t)$, and the reception signal r(t) may consist of reception signal components $r_1(t)$ and $r_2(t)$. Here, the reception signal components $r_1(t)$ and $r_2(t)$ may correspond to the transmission signal components $x_1(t)$ and $x_2(t)$, respectively. In other words, the reception signal components $r_1(t)$ and $r_2(t)$ may correspond to reception results of the transmission signal components $x_1(t)$ and $x_2(t)$, respectively. The transmission signal components $x_1(t)$ and $x_2(t)$ may have a relatively short length in the time domain compared to the transmission signal p(t). The reception signal components $r_1(t)$ and $r_2(t)$ may have a relatively short length in the time domain compared to the reception signal r(t). Assuming that $\tau$ is sufficiently small, the correlation coefficient $\rho_{pr}(\tau)$ between the transmission signal p(t) and the reception signal r(t) may be approximated identically or similarly to Equation 20.

$$\rho_{pr}(\tau) \approx 0.5\rho_{x_1r_1}(\tau) + 0.5\rho_{x_2r_2}(\tau) \quad \text{[Equation 20]}$$

Referring to Equation 20, the correlation coefficient $\rho_{pr}(\tau)$ between the transmission signal p(t) and the reception signal r(t) may be defined as or approximated to a linear combination of correlation coefficients $\rho_{x_1r_1}(\tau)$ and $\rho_{x_2r_2}(\tau)$ between the transmission signal components $r_1(t)$ and $r_2(t)$ and the reception signal components $r_1(t)$ and $r_2(t)$. In other words, the correlation coefficient characteristics of the transmission signal p(t) may be determined based on the correlation coefficient characteristics of the transmission signal components $x_1(t)$ and $x_2(t)$ having relatively short lengths in the time domain. The synchronization signals 500, 550, and 560 according to the third to fifth exemplary embodiments described with reference to FIGS. 5A to 5C may have characteristics that are robust to effects of the Doppler shift, CFO, phase noise, and the like. However, this is only an example for convenience of description, and the correlation coefficient characteristics of synchronization signals in the communication system may be variously represented based on other characteristics of the synchronization signal component set $\Lambda$.

When Equation 16 and Equation 20 are combined, the same or similar conclusion as Equation 21 may be derived.

$$|\rho_{pr}(\tau)| = \left|0.5\rho_{x_1r_1}(\tau)\left(1 + e^{j2\pi\Delta f t}\right)\right| \leq \left|\rho_{x_1r_1}(\tau)\right| \quad \text{[Equation 21]}$$

In Equation 21, an equal relation may be established when $\tau=0$. Referring to Equation 21, in the case of the synchronization signals 500, 550, and 560 according to the third to fifth exemplary embodiments of the synchronization signal described with reference to FIGS. 5A to 5C, when $\tau\neq0$, a value of the correlation coefficient $\rho_{pr}(\tau)$ may be smaller than a value of the correlation coefficient $\rho_{x_1r_1}(\tau)$. In other words, a value of $\rho_{pr}(\tau)$ at a sidelobe (when $\tau\neq0$) may be smaller than a value of the correlation coefficient $\rho_{x_1r_1}(\tau)$ at the side lobe. Here, the value of the correlation coefficient $\rho_{pr}(\tau)$ may correspond to the correlation coefficient characteristic of the synchronization signal p(t), and the value of the correlation coefficient $\rho_{x_1r_1}(\tau)$ may correspond to the correlation coefficient of the synchronization signal component $x_1(t)$. Equation 21 shows that the synchronization signals 500, 550, and 560 according to the third to fifth exemplary embodiments described with reference to FIGS. 5A to 5C can have the performance of a long synchronization signal although they are generated by concatenating relatively short synchronization signal components. As described above, in generating a synchronization signal by concatenating synchronization signal components having short lengths, a design in which specific characteristics can be imparted to improve performance of the synchronization signal may be applied.

Figure 6:
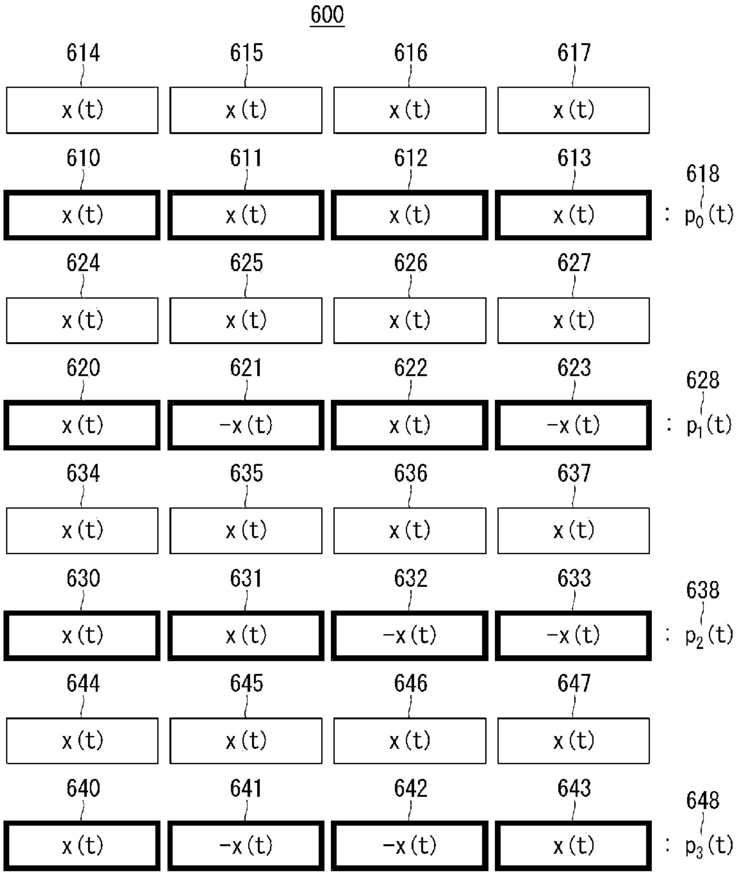
FIG. 6 is a conceptual diagram for describing a sixth exemplary embodiment of a synchronization signal.

FIG. 6 is a conceptual diagram for describing a sixth exemplary embodiment of a synchronization signal.

Referring to FIG. 6, a synchronization signal structure 600 according to the sixth exemplary embodiment of the synchronization signal may be configured to include a layered synchronization signal. Hereinafter, in describing the sixth exemplary embodiment of the synchronization signal with reference to FIG. 6, description overlapping those described with reference to FIGS. 1 to 5C may be omitted.

In an exemplary embodiment of the communication system, one synchronization signal may be used alone. Meanwhile, in another exemplary embodiment of the communication system, a synchronization signal set composed of a plurality of synchronization signals may be configured, and the synchronization signals constituting the synchronization signal set may be used. When the number of elements of the synchronization signal set W is a natural number $N_W$, the synchronization signal set W may be expressed identically or similarly to Equation 22.

$$\mathcal{W} = \{p_0(t), p_1(t), \ldots, p_{N_W-1}(t)\} \quad \text{[Equation 22]}$$

Referring to Equation 22, the synchronization signal set W may have $N_W$ synchronization signals $p_i(t)$ (i=0, 1, . . . , NW−1) as elements. In the synchronization signal structure 600 shown in FIG. 6, $N_W$ may defined as $N_W=4$. That is, the synchronization signal set W according to Equation 22 may include four synchronization signals $p_0(t)$ 618, $p_1(t)$ 628, $p_2(t)$ 638, and $p_3(t)$ 648 as elements. However, this is only an example for convenience of description, and the seventh exemplary embodiment of the synchronization signal is not limited thereto.

Each of the four synchronization signals $p_0(t)$ 618, $p_1(t)$ 628, $p_2(t)$ 638, and $p_3(t)$ 648 constituting the synchronization signal set W may be generated based on the synchronization signal component set $\Lambda$. For example, each of the synchronization signals 618, 628, 638, and 648 may be determined identically or similarly to Equation 23.

$$\{g_i, A_i, X_i|\Lambda\} \mapsto p_i(t),\ i = 0, 1, 2, 3 \quad \text{[Equation 23]}$$

In Equation 23, $p_1(t)$ may mean each of the synchronization signals 618, 628, 638, and 648. The synchronization signal $p_i(t)$ may be determined based on a vector $g_i$, matrix $A_i$, matrix $X_i$, and the like. In the exemplary embodiment shown in FIG. 6, the vector $g_i$, matrix $A_i$, matrix $X_i$, and synchronization signal component set $\Lambda$ for determining the synchronization signal $p_i(t)$ may be expressed identically or similarly to Equation 24.

$$\begin{aligned} g_0 &= [+1\ \ +1\ \ +1\ \ +1] \\ g_1 &= [+1\ \ -1\ \ +1\ \ -1] \\ g_2 &= [+1\ \ +1\ \ -1\ \ -1] \\ g_3 &= [+1\ \ -1\ \ -1\ \ +1] \\ A_i &= [+1\ \ +1\ \ +1\ \ +1]\forall i \\ X_i &= [x(t)\ \ x(t)\ \ x(t)\ \ x(t)]\forall i \\ \Lambda &= \{x(t)\} \end{aligned} \quad \text{[Equation 24]}$$

In Equation 24, each of four vectors $g_1$, $g_2$, $g_3$, and $g_4$ may correspond to a row of a (4×4) Walsh matrix represented by Equation 25.

$$\begin{matrix} +1 & +1 & +1 & +1 \\ +1 & -1 & +1 & -1 \\ +1 & +1 & -1 & -1 \\ +1 & -1 & -1 & +1 \end{matrix} \quad \text{[Equation 25]}$$

Referring to Equation 24, each of the synchronization signals 618, 628, 638, and 648 may be generated based on the synchronization signal component set $\Lambda$ having only one synchronization signal component x(t) as an element. The synchronization signal $p_0(t)$ 618 may be composed of a combination of synchronization signal sections 610, 611, . . . , and 617 generated based on Equation 24. The synchronization signal $p_1(t)$ 628 may be composed of a combination of synchronization signal sections 620, 621, . . . , and 627 generated based on Equation 24. The synchronization signal $p_2(t)$ 638 may be composed of a combination of synchronization signal sections 630, 631, . . . , and 637 generated based on Equation 24. The synchronization signal $p_3(t)$ 648 may be composed of a combination of synchronization signal sections 640, 641, . . . , and 647 generated based on Equation 24.

Figure 7:
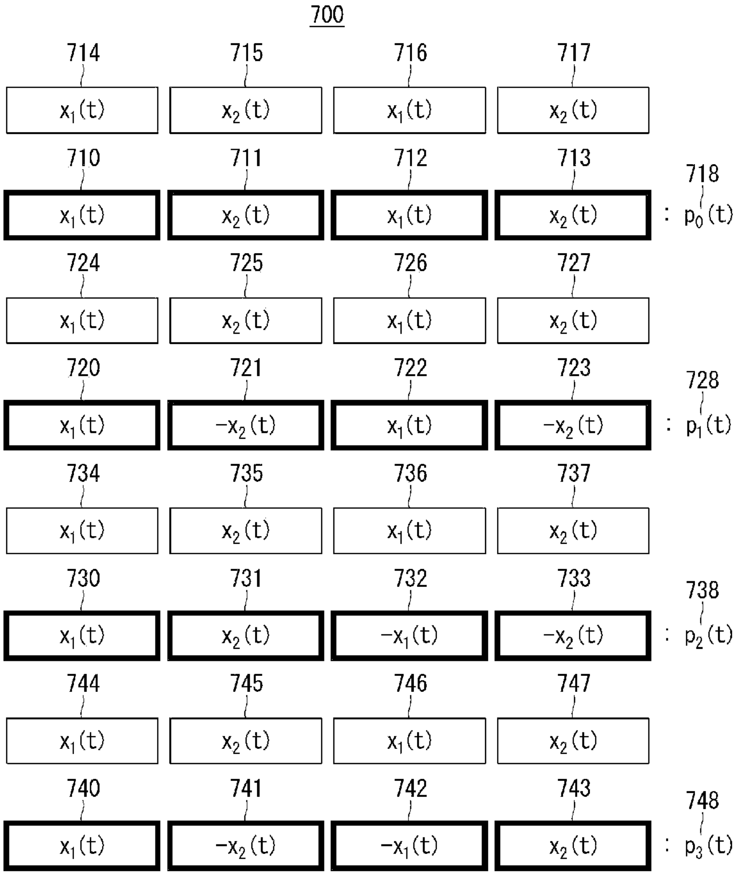
FIG. 7 is a conceptual diagram for describing a seventh exemplary embodiment of a synchronization signal.

FIG. 7 is a conceptual diagram for describing a seventh exemplary embodiment of a synchronization signal.

Referring to FIG. 7, a synchronization signal structure 700 according to the seventh exemplary embodiment of the synchronization signal may include a layered synchronization signal. Hereinafter, in describing the seventh exemplary embodiment of the synchronization signal with reference to FIG. 7, description overlapping those described with reference to FIGS. 1 to 6 may be omitted.

In the synchronization signal structure 700 shown in FIG. 7, a synchronization signal set W may include four synchronization signals $p_0(t)$ 718, $p_1(t)$ 728, $p_2(t)$ 738, and $p_3(t)$ 748 as elements. However, this is only an example for convenience of description, and the seventh exemplary embodiment of the synchronization signal is not limited thereto.

Each of the synchronization signals 718, 728, 738, and 748 may be expressed as a synchronization signal $p_i(t)$. A vector $g_i$, matrix $A_i$, matrix $X_i$, and synchronization signal component set $\Lambda$ for determining the synchronization signal $p_i(t)$ may be expressed identically or similarly to Equation 26.

$$\begin{aligned} g_0 &= [+1\ \ +1\ \ +1\ \ +1] \\ g_1 &= [+1\ \ -1\ \ +1\ \ -1] \\ g_2 &= [+1\ \ +1\ \ -1\ \ -1] \\ g_3 &= [+1\ \ -1\ \ -1\ \ +1] \\ A_i &= [+1\ \ +1\ \ +1\ \ +1]\forall i \\ X_i &= [x_1(t)\ \ x_2(t)\ \ x_1(t)\ \ x_2(t)]\forall i \\ \Lambda &= \{x_1(t), x_2(t)\} \end{aligned} \quad \text{[Equation 26]}$$

In Equation 26, each of the four vectors $g_1$, $g_2$, $g_3$, and $g_4$ may correspond to a row of a Walsh matrix having a size of 4×4 represented by Equation 25. Referring to Equation 26, each of the synchronization signals 718, 728, 738, and 748 may be generated based on the synchronization signal component set $\Lambda$ having two synchronization signal components $x_1(t)$ and $x_2(t)$ as elements. The synchronization signal $p_0(t)$ 718 may be composed of a combination of synchronization signal sections 710, 711, . . . , and 717 generated based on Equation 27. The synchronization signal $p_1(t)$ 728 may be composed of a combination of synchronization signal sections 720, 721, . . . , and 727 generated based on Equation 27. The synchronization signal $p_2(t)$ 738 may be composed of a combination of synchronization signal sections 730, 731, . . . , and 737 generated based on Equation 27. The synchronization signal $p_3(t)$ 748 may be composed of a combination of synchronization signal sections 740, 741, . . . , and 747 generated based on Equation 27.

Meanwhile, in an exemplary embodiment of the communication system, the synchronization signal set W may be generated based on the synchronization signal component set $\Lambda$ including a plurality of (e.g., four) synchronization signal components as in Equation 27.

$$\begin{aligned} \mathcal{W} &= \{p_0(t), p_1(t), p_2(t), p_3(t)\} \\ g_0 &= [+1\ \ +1\ \ +1\ \ +1] \\ g_1 &= [+1\ \ -1\ \ +1\ \ -1] \\ g_2 &= [+1\ \ +1\ \ -1\ \ -1] \\ g_3 &= [+1\ \ -1\ \ -1\ \ +1] \\ A_i &= [+1\ \ +1\ \ +1\ \ +1]\forall i \\ X_i &= [x_1(t)\ \ x_2(t)\ \ x_3(t)\ \ x_4(t)]\forall i \\ \Lambda &= \{x_1(t), x_2(t), x_3(t), x_4(t)\} \end{aligned} \quad \text{[Equation 27]}$$

In Equations 24, 26, and 27, it may be seen that exemplary embodiments in which the matrix $A_i$ and the matrix $X_i$ applied for each synchronization signal $p_i(t)$ are all the same are expressed. However, this is only an example for convenience of description, and exemplary embodiments of the communication system are not limited thereto. For example, in another exemplary embodiment of the communication system, the synchronization signal set W may be generated based on an equation in which the matrix $A_i$ and/or the matrix $X_i$ applied to each synchronization signal $p_i(t)$ are different from each other, as shown in Equation 28.

$$\mathcal{W} = \{p_0(t), p_1(t), p_2(t), p_3(t)\} \quad \text{[Equation 28]}$$
$$g_0 = [+1\ \ +1\ \ +1\ \ +1]$$
$$g_1 = [+1\ \ -1\ \ +1\ \ -1]$$
$$g_2 = [+1\ \ +1\ \ -1\ \ -1]$$
$$g_3 = [+1\ \ -1\ \ -1\ \ +1]$$
$$A_i = [+1\ \ +1\ \ +1\ \ +1]\ \forall i$$
$$X_0 = [x_1(t)\ \ x_1(t)\ \ x_1(t)\ \ x_1(t)]$$
$$X_1 = [x_2(t)\ \ x_2(t)\ \ x_2(t)\ \ x_2(t)]$$
$$X_2 = [x_3(t)\ \ x_3(t)\ \ x_3(t)\ \ x_3(t)]$$
$$X_3 = [x_4(t)\ \ x_4(t)\ \ x_4(t)\ \ x_4(t)]$$
$$\Lambda = \{x_1(t), x_2(t), x_3(t), x_4(t)\}$$

Figure 8:
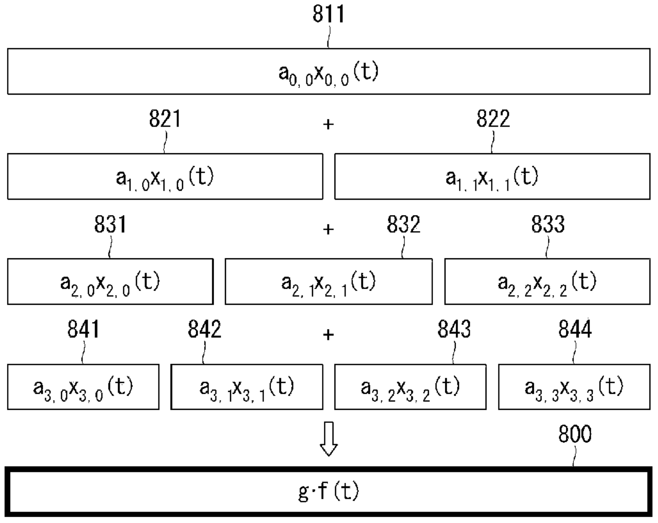
FIG. 8 is a conceptual diagram for describing an eighth exemplary embodiment of a synchronization signal.

FIG. 8 is a conceptual diagram for describing an eighth exemplary embodiment of a synchronization signal.

Referring to FIG. 8, a synchronization signal 800 according to the eighth exemplary embodiment of the synchronization signal may be configured as a layered synchronization signal. Hereinafter, in describing the eighth exemplary embodiment of the synchronization signal with reference to FIG. 8, descriptions overlapping those described with reference to FIGS. 1 to 7 may be omitted.

In the first to seventh exemplary embodiments of the synchronization signal described with reference to FIGS. 4A to 7, the synchronization signal may be generated based on one synchronization signal component (e.g., x(t), etc.) or may be generated based on a plurality of synchronization signal components (e.g., $x_i(t)$, etc.) having the same length in the time domain. Meanwhile, in the eighth exemplary embodiment of the synchronization signal, the synchronization signal p(t) may be generated based on a plurality of synchronization signal components $x_{m,n}(t)$, and at least part among the plurality of synchronization signal components $x_{m,n}(t)$ may have different lengths in the time domain.

In the eighth exemplary embodiment of the synchronization signal, the synchronization signal p(t) 800 may be defined based on one or more synchronization signal parts g·f(t). When there is one synchronization signal part, the one synchronization signal part may correspond to the synchronization signal p(t) 800. On the other hand, when there are a plurality of synchronization signal parts, a result of concatenating the plurality of synchronization signal parts in the time domain may correspond to the synchronization signal p(t) 800. FIG. 8 shows an exemplary embodiment in which the synchronization signal p(t) 800 is generated based on one synchronization signal part. However, the eighth exemplary embodiment of the synchronization signal is not limited to this.

The length of the synchronization signal p(t) 800 in the time domain may be expressed as $L_P$. Meanwhile, the length of each synchronization signal parts in the time domain may be expressed as $L_S$. When there are a plurality of synchronization signal parts, the plurality of synchronization signal parts may have the same length $L_S$ or different lengths.

The synchronization signal p(t) 800 may be generated based on the synchronization signal component set Λ. The synchronization signal component set Λ may include a plurality of synchronization signal components $x_{m,n}(t)$. As one or more synchronization signal sections generated based on one or more synchronization signal components $x_{m,n}(t)$ are concatenated in the time domain, a synchronization signal part bundle having the same length as the length of the synchronization signal p(t) 800 in the time domain may be generated. For example, the synchronization signal component set Λ may be expressed identically or similarly to Equation 29.

$$\Lambda = \{x_{0,0}(t), x_{1,0}(t), x_{1,1}(t), x_{2,0}(t), x_{2,1}(t), x_{2,2}(t), x_{3,0}(t), x_{3,1}(t), x_{3,2}(t), x_{3,3}(t)\} \quad \text{[Equation 29]}$$

In Equation 29, the length of the synchronization signal component $x_{0,0}(t)$ in the time domain may be $L_S$. The synchronization signal part $a_{0,0}\cdot x_{0,0}(t)$ 811 defined based on the synchronization signal component $x_{0,0}(t)$ may have the same length as the length $L_S$ of one synchronization signal part in the time domain. One synchronization signal part $a_{0,0}\cdot x_{0,0}(t)$ 811 may be regarded as corresponding to a first synchronization signal part bundle 810.

The lengths of the synchronization signal components $x_{1,0}(t)$ and $x_{1,1}(t)$ in the time domain may be (½)$L_S$. Two synchronization signal sections $a_{1,0}\cdot x_{1,0}(t)$ 821 and $a_{1,1}\cdot x_{1,1}(t)$ 822 defined based on the synchronization signal components $x_{1,0}(t)$ and $x_{1,1}(t)$ may each have a length corresponding to ½ of the length $L_S$ of one synchronization signal part in the time domain. A second synchronization signal part bundle 820 corresponding to a result of concatenating two synchronization signal sections in the time domain may have the same length as the length $L_S$ of the synchronization signal part in the time domain.

The lengths of the synchronization signal components $x_{2,0}(t)$, $x_{2,1}(t)$, and $x_{2,2}(t)$ in the time domain may be (⅓)$L_S$. Three synchronization signal sections $a_{2,0}\cdot x_{2,0}(t)$ 831, $a_{2,1}\cdot x_{2,1}(t)$ 832, and $a_{2,2}\cdot x_{2,2}(t)$ 833 defined based on the synchronization signal components $x_{2,0}(t)$, $x_{2,1}(t)$, and $x_{2,2}(t)$ may each have a length corresponding to ⅓ of the length $L_S$ of the synchronization signal part in the time domain. A third synchronization signal part bundle 830 corresponding to a result of concatenating the three synchronization signal sections in the time domain may have the same length as the length $L_S$ of the synchronization signal part in the time domain.

The length of the synchronization signal components $x_{3,0}(t)$, $x_{3,1}(t)$, $x_{3,2}(t)$, and $x_{3,3}(t)$ in the time domain may be (¼)$L_S$. The four synchronization signal sections $a_{3,0}\cdot x_{3,0}(t)$ 841, $a_{3,1}\cdot x_{3,1}(t)$ 842, $a_{3,2}\cdot x_{3,2}(t)$ 843, and $a_{3,3}\cdot x_{3,3}(t)$ 844 defined based on the synchronization signal components $x_{3,0}(t)$, $x_{3,1}(t)$, $x_{3,2}(t)$, and $x_{3,3}(t)$ may have a length corresponding to ¼ of the length $L_S$ of the synchronization signal part in the time domain. A fourth synchronization signal part bundle 840 corresponding to a result of concatenating the four synchronization signal sections in the time domain may have the same length as the length $L_S$ of the synchronization signal part in the time domain.

One or more synchronization signal parts may be generated by summing one or more synchronization signal part bundles generated based on one or more synchronization signal sections. For example, a plurality of synchronization signal part bundles 810, 820, 830, and 840 may be generated according to a plurality of synchronization signal sections 811, 821, 822, 831, 832, 833, 841, 842, 843, and 844 based on a plurality of synchronization signal components. By summing the plurality of synchronization signal part bundles 810, 820, 830, and 840, the synchronization signal part g·f(t) 800 may be generated. Since only one synchronization signal part exists, the synchronization signal part 800 generated as described above may correspond to the synchronization signal p(t).

In the exemplary embodiment shown in FIG. 8, the vector g, matrix A, matrix X, and synchronization signal component set Λ may be expressed identically or similarly to Equation 30.

$$g = [1] \quad \text{[Equation 30]}$$

$$A = \begin{bmatrix} a_{0,0}(t) & 0 & 0 & 0 \\ a_{1,0}(t) & a_{1,0}(t) & 0 & 0 \\ a_{2,0}(t) & a_{2,1}(t) & a_{2,2}(t) & 0 \\ a_{3,0}(t) & a_{3,1}(t) & a_{3,2}(t) & a_{3,3}(t) \end{bmatrix}$$

$$X = \begin{bmatrix} x_{0,0}(t) & 0 & 0 & 0 \\ x_{1,0}(t) & x_{1,0}(t) & 0 & 0 \\ x_{2,0}(t) & x_{2,1}(t) & x_{2,2}(t) & 0 \\ x_{3,0}(t) & x_{3,1}(t) & x_{3,2}(t) & x_{3,3}(t) \end{bmatrix}$$

$$\Lambda = \{x_{0,0}(t), x_{1,0}(t), x_{1,1}(t), x_{2,0}(t), x_{2,1}(t), x_{2,2}(t), x_{3,0}(t), x_{3,1}(t), x_{3,2}(t), x_{3,3}(t)\}$$

Figure 9:
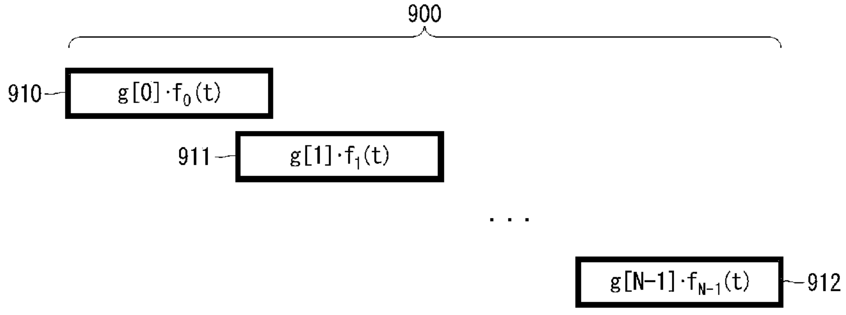
FIG. 9 is a conceptual diagram for describing a ninth exemplary embodiment of a synchronization signal.

FIG. 9 is a conceptual diagram for describing a ninth exemplary embodiment of a synchronization signal.

Referring to FIG. 9, a synchronization signal 900 according to the ninth exemplary embodiment of the synchronization signal may be configured as a layered synchronization signal. Hereinafter, in describing the ninth exemplary embodiment of the synchronization signal with reference to FIG. 9, descriptions overlapping those described with reference to FIGS. 1 to 8 may be omitted.

In an exemplary embodiment of the communication system, a synchronization signal may be generated based on the synchronization signal component set Λ. One or more synchronization signal sections may be generated based on the synchronization signal component set Λ. One or more synchronization signal parts may be generated based on the one or more synchronization signal sections. The synchronization signal may be generated by concatenating or combining the one or more synchronization signal parts.

In the first to eighth exemplary embodiments of the synchronization signal described with reference to FIGS. 4A to 8, when the synchronization signal is generated based on a plurality of synchronization signal parts, the synchronization signal may be generated by concatenating (or combining) the plurality of synchronization signal parts without overlapping in the time domain. On the other hand, in the ninth exemplary embodiment of the synchronization signal, when the synchronization signal is generated based on a plurality of synchronization signal parts, the synchronization signal may be generated by concatenating (or combining) the plurality of synchronization signal parts with overlapping between all or some of them.

In the exemplary embodiment shown in FIG. 9, the synchronization signal 900 may be generated based on N synchronization signal parts 910, 911, . . . , and 912. Here, N may be a natural number greater than 1. Values of the N synchronization signal parts 910, 911, . . . , and 912 may be $g[0]\cdot f_0(t)$, $g[1]\cdot f_1(t)$, . . . , and $g[N-1]\cdot f_{N-1}(t)$, respectively. When the synchronization signal 900 is generated based on the N synchronization signal parts 910, 911, . . . , and 912, the synchronization signal 900 may be generated by combining all or some of the N synchronization signal part 910, 911, . . . , 912 with overlapping between all or some of them. Here, a sum operation may be performed for each of periods in which the synchronization signal parts overlap each other. Alternatively, in a period where the synchronization signal parts overlap each other, at least one of two overlapping synchronization signal parts may not have an actual information value. In other words, a period having no actual information value among the synchronization signal parts may be controlled to be overlapped.

Figure 10:
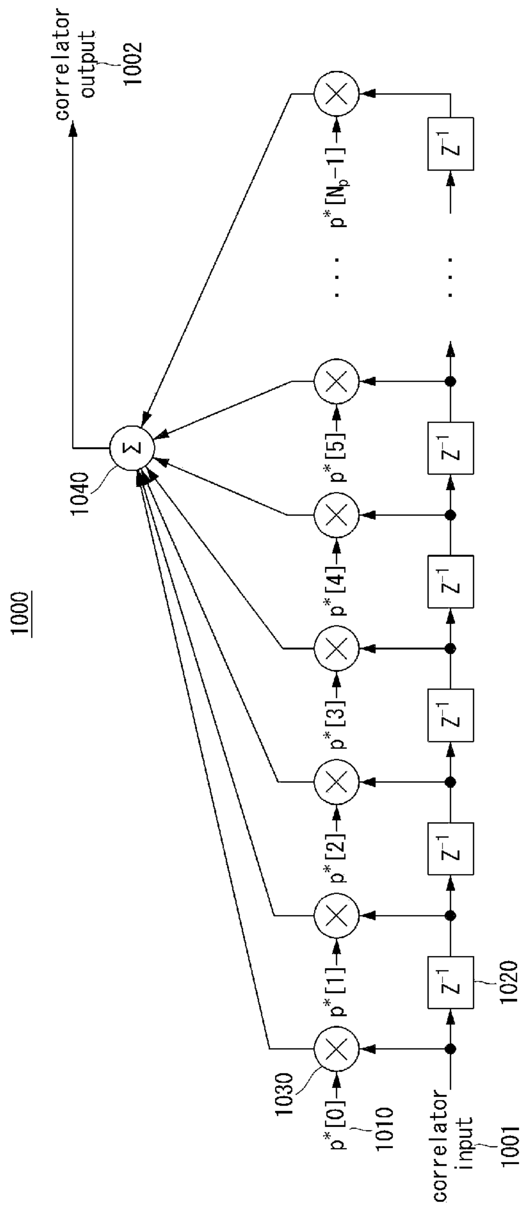
FIG. 10 is a conceptual diagram for describing a first exemplary embodiment of a cross-correlator.

FIG. 10 is a conceptual diagram for describing a first exemplary embodiment of a cross-correlator.

Referring to FIG. 10, in the communication system, a transmitting device may transmit a synchronization signal (hereinafter referred to as a non-layered synchronization signal) that is not a layered synchronization signal. The transmitting device may transmit the non-layered synchronization signal p(t). A receiving device may receive the synchronization signal transmitted from the transmitting device. The receiving device may receive the non-layered synchronization signal based on a cross-correlator identical to or similar to that shown in FIG. 10. Hereinafter, in describing the first exemplary embodiment of the cross-correlator with reference to FIG. 10, descriptions overlapping those described with reference to FIGS. 1 to 9 may be omitted.

In an exemplary embodiment of the communication system, information on the non-layered synchronization signal p(t) may be shared in advance between the transmitting device and the receiving device. The receiving device may convert the synchronization signal p(t) to be detected into a digital signal p[n] composed of $N_p$ samples using an analog-to-digital converter (ADC).

The receiving device may input an correlator input 1001 to a cross-correlator 1000. Here, the correlator input 1001 may mean a signal received and/or demodulated by the receiving device. When the correlator input 1001 is input to the cross-correlator 1000, the cross-correlator 1000 may output a correlator output 1002.

The cross-correlator 1000 may perform a cross-correlation operation based on the signal p[n] with respect to the correlator input 1001. In order to perform the cross-correlation operation based on the signal p[n] composed of $N_p$ samples, the cross-correlator 1000 may include at least $N_p$ memories 1020, $N_p$ multipliers 1030, and one adder 1040.

Figure 11:
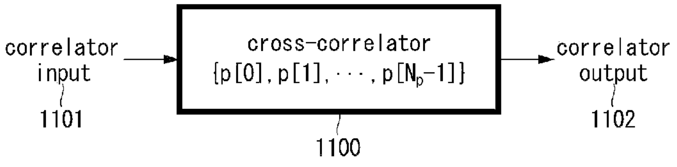
FIG. 11 is a conceptual diagram for describing a second exemplary embodiment of a cross-correlator.

FIG. 11 is a conceptual diagram for describing a second exemplary embodiment of a cross-correlator.

Referring to FIG. 11, the transmitting device in the communication system may transmit a synchronization signal. The receiving device may receive the synchronization signal. In order to easily receive the synchronization signal, the receiving device may include a cross-correlator identical to or similar to that shown in FIG. 11. Hereinafter, in describing the second exemplary embodiment of the cross-correlator with reference to FIG. 11, descriptions overlapping those described with reference to FIGS. 1 to 10 may be omitted.

In an exemplary embodiment of the communication system, the receiving device may convert the synchronization signal p(t) to be detected into a digital signal p[n] (n=0, 1, Np−1) composed of $N_p$ samples by using an ADC. In this case, the signal p[n] may be expressed as Equation 31.

$$p[n],\ n = 0, 1, \ldots, N_p - 1 \quad \text{[Equation 31]}$$

In Equation 31, $N_p$ may be a natural number indicating the number of samples of the digital signal p[n]. The cross-correlator 1100 may perform an operation for detecting a component corresponding to the synchronization signal p(n) in the received signal using the converted signal p[n].

The receiving device may input a correlator input 1101 to the cross-correlator 1100. Here, the correlator input 1101 may be a signal received and/or demodulated by the receiving device. The cross-correlator 1100 may perform a cross-correlation operation based on the signal p[n] (n=0, 1, . . . , Np−1) with respect to the correlator input 1101. The cross-correlator 1100 may output a correlator output 1102.

In an exemplary embodiment of the communication system, the receiving device may receive a non-layered synchronization signal transmitted from the transmitting device. In this case, the receiving device may detect the received non-layered synchronization signal based on a cross-correlator identical to or similar to the first exemplary embodiment of the cross-correlator described with reference to FIG. 10. In other words, if the cross-correlator 1100 is configured identically or similarly to the cross-correlator 1000 described with reference to FIG. 10, the receiving device may detect the non-layered synchronization signal using the cross-correlator 1100.

On the other hand, in an exemplary embodiment of the communication system, the receiving device may receive a layered synchronization signal transmitted from the transmitting device. In this case, the receiving device may detect the received layered synchronization signal based on the same or similar synchronization signal detectors as in the first to third exemplary embodiments of the synchronization signal detector to be described with reference to FIGS. 13 to 15. If otherwise required, when the cross-correlator 1100 is included in any one of the synchronization signal detectors shown in FIGS. 13 to 15, the receiving device may use the synchronization signal detector including the cross-correlator 1100 to detect the layered synchronization signal.

Figure 12:
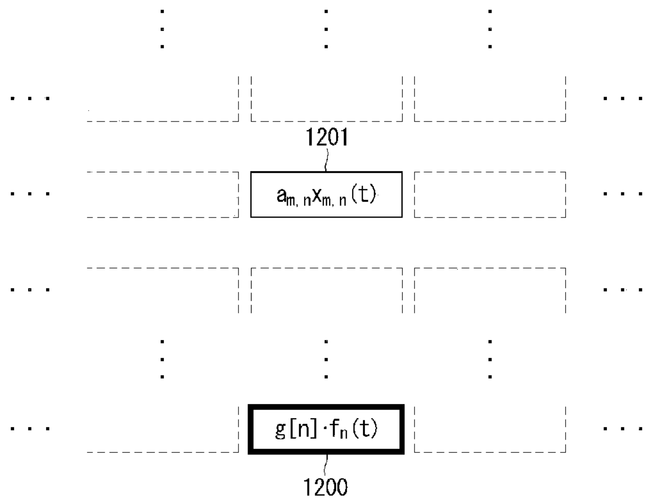
FIG. 12 is a conceptual diagram for describing a tenth exemplary embodiment of a synchronization signal.

FIG. 12 is a conceptual diagram for describing a tenth exemplary embodiment of a synchronization signal.

Referring to FIG. 12, a synchronization signal according to the tenth exemplary embodiment of the synchronization signal may be configured as a layered synchronization signal. Hereinafter, in describing the tenth exemplary embodiment of the synchronization signal with reference to FIG. 12, descriptions overlapping those described with reference to FIGS. 1 to 11 may be omitted.

The layered synchronization signal may be generated based on one or more synchronization signal components that are elements of the synchronization signal component set Λ. For example, based on the synchronization signal component $x_{m,n}(t)$ and the corresponding coefficient $a_{m,n}(t)$, a synchronization signal part $a_{m,n}\cdot x_{m,n}(t)$ 1201 may be generated. In addition, $f_n(t)$ may be generated based on a combination of one or more synchronization signal sections including $a_{m,n}\cdot x_{m,n}(t)$ 1201. Based on the generated $f_n(t)$ and the corresponding coefficients g[n], an n-th synchronization signal part $g[n]f_n(t)$ 1200 may be generated. As one or more synchronization signal parts are concatenated (or combined), the synchronization signal may be generated.

In other words, the synchronization signal may be generated based on N synchronization signal parts. Among the N synchronization signal parts, the n-th synchronization signal part $g[n]f_n(t)$ 1200 may be generated based on M synchronization signal sections. Among the M synchronization signal sections, the m-th synchronization signal part $a_{m,n}\cdot x_{m,n}(t)$ 1201 may be generated based on the synchronization signal component $x_{m,n}(t)$, which is an element of the synchronization signal component set Λ.

In an exemplary embodiment of the communication system, the synchronization signal received by the receiving device may have the same or similar structure as that of the tenth exemplary embodiment of the synchronization signal shown in FIG. 12. The receiving device may include a synchronization signal detector to detect the received synchronization signal. The synchronization signal detector may include one or more cross-correlator modules. Each of the one or more cross-correlator modules may be configured to perform an operation for detecting a specific synchronization signal component, a specific synchronization signal part, a specific synchronization signal part bundle, or a specific synchronization signal part. For example, FIG. 13 shows an exemplary embodiment of a cross-correlator module configured to perform a detection operation corresponding to the synchronization signal component $x_{m,n}(t)$ or the synchronization signal part $a_{m,n}\cdot x_{m,n}(t)$ 1201.

Figure 13:
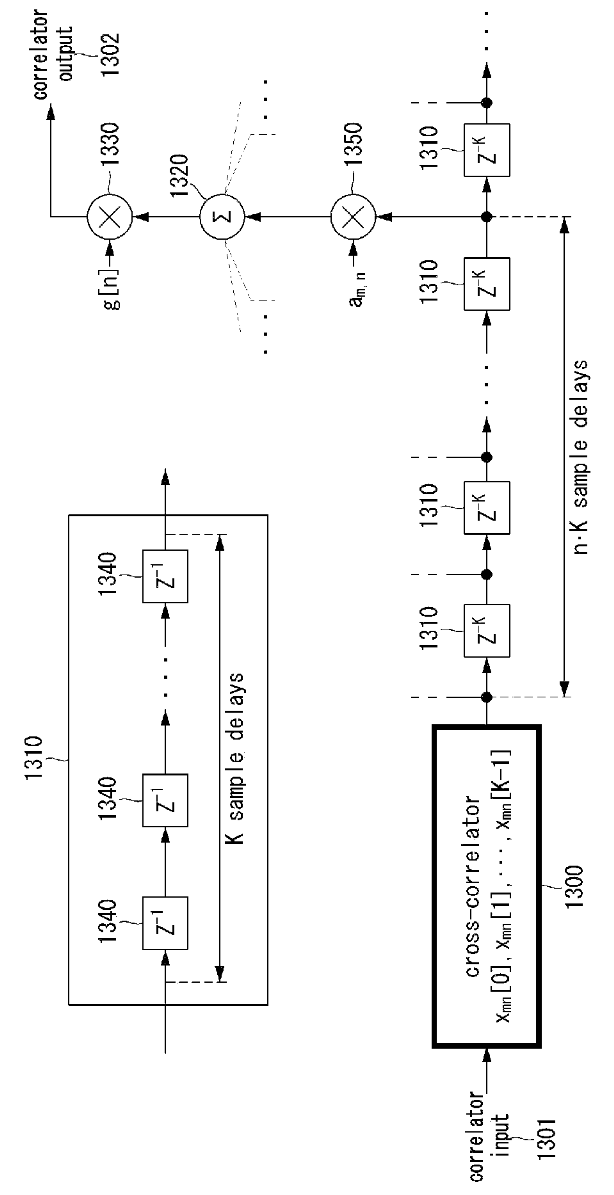
FIG. 13 is a conceptual diagram for describing a first exemplary embodiment of a synchronization signal detector.

FIG. 13 is a conceptual diagram for describing a first exemplary embodiment of a synchronization signal detector.

Referring to FIG. 13, a synchronization signal detector according to the first exemplary embodiment may be configured to detect a layered synchronization signal. The synchronization signal detector may be configured to detect the layered synchronization signal according to at least one of the first to ninth exemplary embodiments of the synchronization signal described with reference to FIGS. 4A to 9. To this end, the synchronization signal detector may include one or more cross-correlator modules. Each cross-correlator module may have the same or similar structure as the structure shown in FIG. 13. Hereinafter, in describing the first exemplary embodiment of the synchronization signal detector with reference to FIG. 13, descriptions overlapping those described with reference to FIGS. 1 to 12 may be omitted.

Each of the one or more cross-correlator modules included in the synchronization signal detector may include a cross-correlator 1300. A correlator input 1301 may be input to the cross-correlator 1300 of the cross-correlator module. The cross-correlator module may perform an operation based on the structure of the cross-correlator module and output a correlator output 1302.

Specifically, information on at least a part of the vector g, matrix A, matrix X, and synchronization signal component set Λ for generating the layered synchronization signal may be shared in advance between the transmitting device and the receiving device. The receiving device may convert the synchronization signal component which is an element of the synchronization signal component set Λ, into a digital signal $x_{m,n}[k]$ (k=0, 1, . . . , K−1) composed of K samples. The signal $x_{m,n}[k]$ may be expressed as $x_{mn}[k]$. The synchronization signal detector of the receiving device may perform an operation for detecting a component corresponding to the synchronization signal component $x_{m,n}(t)$ in the received signal using the converted signal $x_{m,n}[k]$.

The receiving device may input the correlator input 1301 to the cross-correlator 1300 included in the synchronization signal detector. Here, the correlator input 1301 may mean a signal received and/or demodulated by the receiving device. The cross-correlator 1300 may perform a cross-correlation operation based on the signal $x_{m,n}[k]$ with respect to the correlator input 1301.

The signal output from the cross-correlator 1300 may be input to multiplier(s) or may undergo operations at one or more sample delays. Specifically, the cross-correlator module may include one or more K-sample delays $Z^{-K}$ 1310.

Each of the one or more K-sample delays $Z^{-K}$ 1310 may consist of K sample delays $Z^{-1}$ 1340. The signal output from the cross-correlator 1300 may be input to a first multiplier 1350 after passing through n K-sample delays $Z^{-K}$ 1310. In the first multiplier 1350, the coefficient $a_{m,n}(t)$ may be multiplied. A signal output from the multiplier 1350 may be input to an adder 1320. In the adder 1320, one or more signals output from respective multipliers of the one or more cross-correlator modules may be added. An output of the adder 1320 may be input to a second multiplier 1330. In the second multiplier 1330, the coefficient g[n] may be multiplied. A signal output from the second multiplier 1330 may correspond to an output of the cross-correlator module (i.e., the correlator output 1302).

The cross-correlator module according to the first exemplary embodiment of the synchronization signal detector shown in FIG. 13 may correspond to the synchronization signal part $a_{m,n}\cdot x_{m,n}(t)$ 1201 described with reference to FIG. 12. The cross-correlator module shown in FIG. 13 may perform an operation for detecting (or restoring) the synchronization signal part $a_{m,n}\cdot x_{m,n}(t)$ 1201. Based on the correlator output 1302 output from the cross-correlator module, detection (or restoration) of the synchronization signal part $a_{m,n}\cdot x_{m,n}(t)$ 1201 may be performed.

Figure 14:
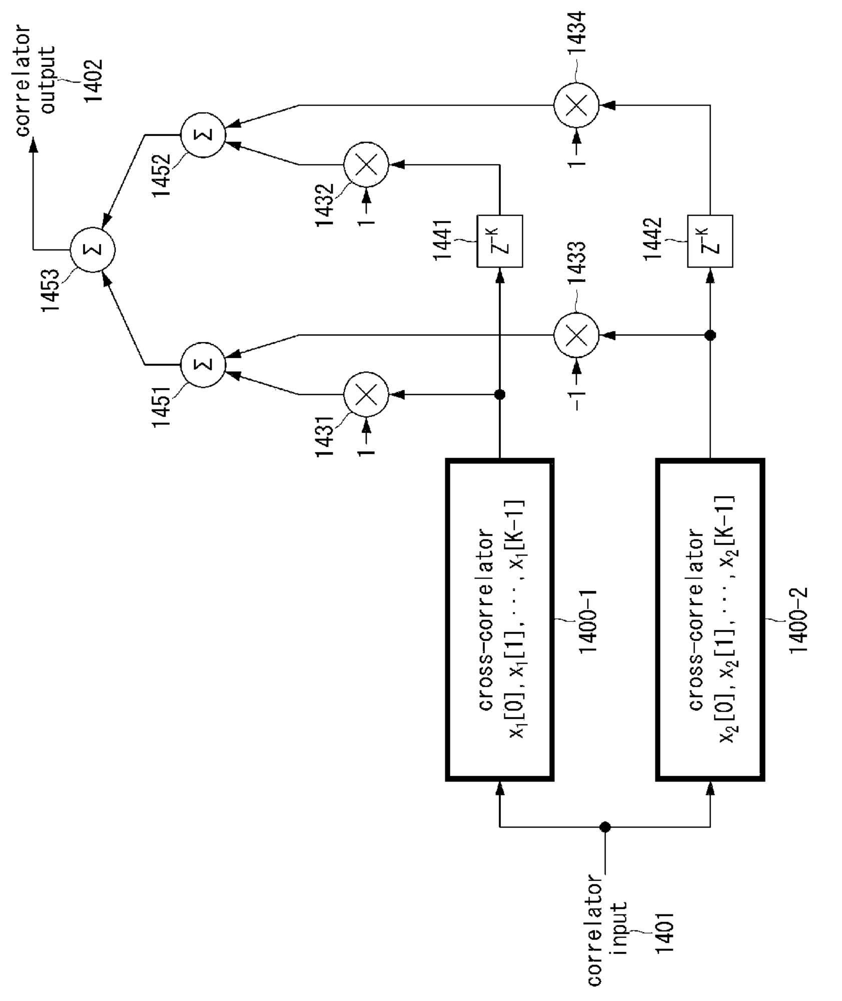
FIG. 14 is a conceptual diagram for describing a second exemplary embodiment of a synchronization signal detector.

FIG. 14 is a conceptual diagram for describing a second exemplary embodiment of a synchronization signal detector.

Referring to FIG. 14, a synchronization signal detector according to the second exemplary embodiment of the synchronization signal detector may be configured to detect a layered synchronization signal. The synchronization signal detector may be configured to detect a layered synchronization signal according to at least one of the first to ninth exemplary embodiments of the synchronization signal described with reference to FIGS. 4A to 9. To this end, the synchronization signal detector may include one or more cross-correlator modules. FIG. 14 shows an exemplary embodiment of a synchronization signal detector structure including a plurality of cross-correlator modules. Hereinafter, in describing the second exemplary embodiment of the synchronization signal detector with reference to FIG. 14, descriptions overlapping those described with reference to FIGS. 1 to 13 may be omitted.

In the second exemplary embodiment of the synchronization signal detector, the synchronization signal detector may include a plurality of cross-correlator modules. When J is a natural number greater than 1, the synchronization signal detector may include J cross-correlator modules. The synchronization signal detector including J cross-correlator modules may detect a synchronization signal generated using J synchronization signal components.

In the exemplary embodiment shown in FIG. 14, the synchronization signal detector may include a first cross-correlator module and a second cross-correlator module. The first cross-correlator module may include a first cross-correlator 1400-1, a first multiplier 1431, a second multiplier 1432, a first K-sample delay 1441, and a first adder 1451. The second cross-correlator module may include a second cross-correlator 1400-2, a third multiplier 1433, a fourth multiplier 1434, a second K-sample delay 1442, and a second adder 1452.

Specifically, information on at least a part of the vector g, matrix A, matrix X, and synchronization signal component set Λ for generating the layered synchronization signal may be shared in advance between the transmitting device and the receiving device. The receiving device may convert the synchronization signal components $x_1(t)$ and $x_2(t)$, which are elements of the synchronization signal component set Λ, into digital signals $x_1[k]$ and $x_2[k]$ consisting of K samples using an ADC. The synchronization signal detector of the receiving device may use the first and second cross-correlator modules and the converted signals $x_1[k]$ and $x_2[k]$ to perform an operation for detecting components corresponding to the synchronization signal components $x_1(t)$ and $x_2(t)$ in the received signal.

The receiving device may input a correlator input 1401 to the first cross-correlator 1400-1 and the second cross-correlator 1400-2 included in the synchronization signal detector. Here, the correlator input 1401 may mean a signal received and/or demodulated by the receiving device. The first cross-correlator 1400-1 may perform a cross-correlation operation based on the signal $x_1[k]$ with respect to the correlator input 1401. The second cross-correlator 1400-2 may perform a cross-correlation operation based on the signal $x_2[k]$ with respect to the correlator input 1401.

The synchronization signal detector may further include a third adder 1453 for summing the signals output from the first and second cross-correlator modules. In the synchronizing signal detector shown in FIG. 14, the signals output from the cross-correlator modules may be output as a correlator output 1402 after being added in the adder 1453.

The synchronization signal detector according to the second exemplary embodiment may effectively detect a synchronization signal generated based on a plurality of synchronization signal components (e.g., $x_1(t)$ and $x_2(t)$).

Figure 15:
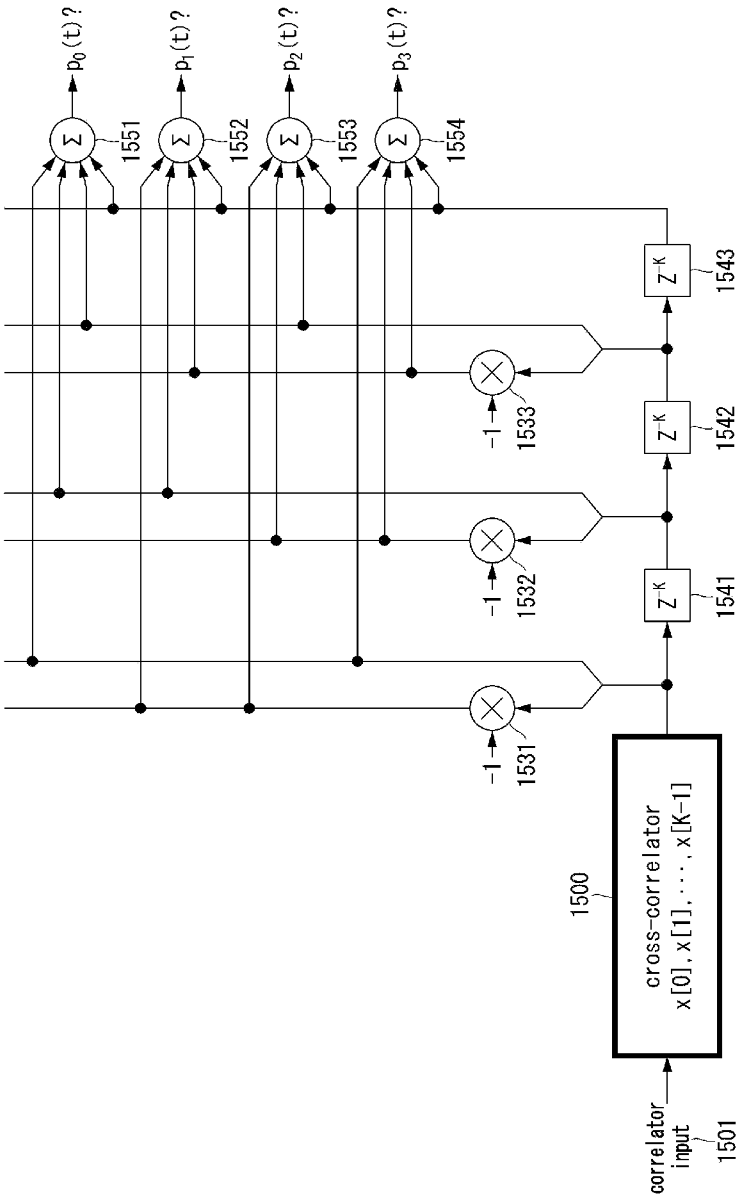
FIG. 15 is a conceptual diagram for explaining a third exemplary embodiment of a synchronization signal detector.

FIG. 15 is a conceptual diagram for explaining a third exemplary embodiment of a synchronization signal detector.

Referring to FIG. 15, a synchronization signal detector according to the third exemplary embodiment of the synchronization signal detector may be configured to detect a layered synchronization signal. The synchronization signal detector may include one or more cross-correlator modules. FIG. 15 shows an exemplary embodiment of a synchronization signal detector structure including one cross-correlator module. Hereinafter, in describing the third exemplary embodiment of the synchronization signal detector with reference to FIG. 15, descriptions overlapping those described with reference to FIGS. 1 to 14 may be omitted.

In the third exemplary embodiment of the synchronization signal detector, the synchronization signal detector may include one or more cross-correlator modules. The synchronization signal detector including one cross-correlator module may perform an operation for detecting a synchronization signal generated based on one synchronization signal component (e.g., x(t)). On the other hand, as in the second exemplary embodiment of the synchronization signal detector described with reference to FIG. 14, the synchronization signal detector including a plurality of cross-correlator modules may perform an operation for detecting a synchronization signal generated based on a plurality of synchronization signal components (e.g., $x_1(t)$, $x_2(t)$). FIG. 15 shows an exemplary embodiment in which the synchronization signal detector includes one cross-correlator module. However, this is only an example for convenience of description, and the third exemplary embodiment of the synchronization signal detector is not limited thereto.

In the third exemplary embodiment of the synchronization signal detector, the synchronization signal detector may perform an operation for detecting a synchronization signal set W composed of one or more synchronization signals. Alternatively, the synchronization signal detector may perform an operation for detecting which synchronization signal a received synchronization signal includes among one or more synchronization signals $p_i(t)$ ($i=0, 1, \ldots, N_W-1$) constituting the synchronization signal set W. Here, the synchronization signal set W may be identical to or similar to the synchronization signal set W described with reference to FIG. 6 or the synchronization signal set W described with reference to FIG. 7.

Specifically, information on at least a part of the vector g, matrix A, matrix X, synchronization signal component set Λ, and synchronization signal set W for generating the layered synchronization signal may be shared in advance between the transmitting device and the receiving device. The receiving device may convert the synchronization signal component x(t), which is an element of the synchronization signal component set Λ, into a digital signal x[k] (k=0, 1, . . . , K−1) consisting of K samples using an ADC. The synchronization signal detector of the receiving device may perform an operation for detecting a component corresponding to the synchronization signal component x(t) in the received signal using the converted signal x[k].

The receiving device may input a correlator input 1501 to a cross-correlator 1500 included in the synchronization signal detector. Here, the correlator input 1501 may mean a signal received and/or demodulated by the receiving device. The cross-correlator 1500 may perform a cross-correlation operation based on the signal x[k] with respect to the correlator input 1501.

In the exemplary embodiment shown in FIG. 15, the number $N_W$ of elements of the synchronization signal set W may be 4. The synchronization signal set W may include four synchronization signals $p_0(t)$, $p_1(t)$, $p_2(t)$, and $p_3(t)$. A signal y(t) output from the cross-correlator 1500 may be input to multipliers, sample delays, adders, and the like. For example, the cross-correlator module includes 3 multipliers 1531, 1532, and 1533, 3 K-sample delays $Z^{-K}$ 1541, 1542, and 1543, 4 adders 1551, 1552, 1553, and 1554, and the like.

The signal y(t) output from the cross-correlator 1500 may be input to the first and fourth adders 1551 and 1554, respectively. Meanwhile, the signal y(t) output from the cross-correlator 1500 may be input to the first multiplier 1531 that performs a '−1' multiplication operation. A signal −y(t) subjected to the '−1' multiplication operation in the first multiplier 1531 may be input to the second and third adders 1552 and 1553, respectively.

Meanwhile, the signal y(t) output from the cross-correlator 1500 may be input to the first K-sample delay 1541 that performs a delay operation of K samples. A signal y(t+K) subjected to the delay operation in the first K-sample delay 1541 may be input to the first and second adders 1551 and 1552, respectively. Meanwhile, the signal y(t+K) subjected to the delay operation in the first K-sample delay 1541 may be input to the second multiplier 1532 that performs a '−1' multiplication operation. A signal −y(t+K) subjected to the '−1' multiplication operation in the second multiplier 1532 may be input to the third and fourth adders 1553 and 1554, respectively.

Meanwhile, the signal y(t+K) subjected to the delay operation in the first K-sample delay 1541 may be input to the second K-sample delay 1542 that performs a delay operation of K samples. A signal y(t+2K) subjected to the delay operation in the second K-sample delay 1542 may be input to the first and third adders 1551 and 1553, respectively. Meanwhile, the signal y(t+2K) subjected to the delay operation in the second K-sample delay 1542 may be input to the third multiplier 1533 that performs a '−1' multiplication operation. A signal −y(t+2K) subjected to the '−1' multiplication operation in the third multiplier 1533 may be input to the second and third adders 1552 and 1553, respectively.

Meanwhile, the signal y(t+2K) subjected to the delay operation in the second K-sample delay 1542 may be input to the third K-sample delay 1543 that performs a delay operation of K samples. A signal y(t+3K) subjected to the delay operation in the third K-sample delay 1543 may be input to the first to fourth adders 1551, 1552, 1553, and 1554, respectively.

The first to fourth adders 1551, 1552, 1553, and 1554 may perform addition operations on the input signals. Each of the first to fourth adders 1551, 1552, 1553, and 1554 may output a result of the addition operation. An output $Y_1(t)$ of the first adder 1551, an output $Y_2(t)$ of the second adder 1552, an output $Y_3(t)$ of the third adder 1553, and an output $Y_4(t)$ of the fourth adder 1554) may be the same as or similar to Equation 32.

[Equation 32]

$$Y_1(t) = y(t) + y(t-K) + y(t-2K) + y(t-3K)$$
$$Y_2(t) = -y(t) + y(t-K) - y(t-2K) + y(t-3K)$$
$$Y_3(t) = -y(t) - y(t-K) + y(t-2K) + y(t-3K)$$
$$Y_4(t) = y(t) - y(t-K) - y(t-2K) + y(t-3K)$$

Based on the output of each of the first to fourth adders 1551, 1552, 1553, and 1554 expressed as in Equation 32, it can be determined which synchronization signal among the elements of the synchronization signal set W the received signal includes a component corresponding to.

According to exemplary embodiments of a method and an apparatus for transmitting/receiving a synchronization signal having a layered structure in a communication system, a transmitting device may generate and transmit a synchronization signal (hereinafter, 'layered synchronization signal') having a layered structure (or multi-layer structure). The layered synchronization signal may be generated based on a synchronization signal component set composed of one or more types of synchronization signals (hereinafter referred to as 'synchronization signal components'). The transmitting device may generate the layered synchronization signal based on a combination (e.g., linear combination) of one or more synchronization signal components included in the synchronization signal component set. The layered synchronization signal generated as described above can simultaneously have the advantages of several types of synchronization signals. Accordingly, the synchronization performance, estimation performance, and the like can be improved based on the synchronization signal.

However, the effects that can be achieved by the exemplary embodiments of the present disclosure are not limited to those mentioned above, and other effects not mentioned may be clearly understood by those of ordinary skill in the art to which the present disclosure belongs from the configurations described in the present disclosure.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. An operation method of a first communication apparatus, comprising: identifying a synchronization signal component set including at least a first synchronization signal component and a second synchronization signal component, wherein the first synchronization signal component and the second synchronization signal component differ from each other in at least one of a cross-correlation characteristic, a carrier frequency offset characteristic, or an autocorrelation characteristic;

generating a plurality of synchronization signal sections based on primary coefficients respectively corresponding to the first synchronization signal component and the second synchronization signal component; generating one or more synchronization signal parts based on a combination of the plurality of synchronization signal sections; generating one or more synchronization signals based on a combination of the one or more synchronization signal parts in time domain; and transmitting, to the second communication apparatus, the generated one or more synchronization signals.

2. The operation method according to claim 1, wherein the synchronization signal component set has J synchronization signal components as elements, and the generating of the plurality of synchronization signal sections comprises: determining a first synchronization signal component matrix using the J synchronization signal components; determining a first primary coefficient matrix having a same size as the first synchronization signal component matrix and composed of the plurality of primary coefficients; and generating the plurality of synchronization signal sections by multiplying elements corresponding to each other in the first synchronization signal component matrix and the first primary coefficient matrix, wherein J is a natural number equal to or greater than 2.

3. The operation method according to claim 1, wherein each of the plurality of synchronization signal sections corresponds to one of first to N-th time periods distinguished from each other in time domain, and the generating of the one or more synchronization signal parts comprises: performing a sum operation for synchronization signal sections corresponding to each of the first to N-th time periods among the plurality of synchronization signal sections, with respect to each of the first to N-th time periods; and generating first to N-th synchronization signal parts respectively corresponding to the first to N th time periods, based on results of the sum operations corresponding to the first to N-th time periods, wherein N is a natural number equal to or greater than 1.

4. The operation method according to claim 3, wherein the generating of the first to N-th synchronization signal parts comprises: identifying first to N-th secondary coefficients respectively corresponding to the first to N-th time periods; performing a multiplication operation between the result of the sum operation corresponding to each of the first to N-th time periods and the first to N-th secondary coefficients corresponding to each of the first to N-th time periods; and obtaining the first to N-th synchronization signal parts respectively corresponding to results of the multiplication operations corresponding to the first to N-th time periods.

5. The operation method according to claim 4, wherein the first to N-th secondary coefficients are determined by elements constituting a specific row or specific column of a Walsh matrix having a size of N×N.

6. The operation method according to claim 1, wherein the plurality of synchronization signal sections have different lengths in time domain, and the generating of the one or more synchronization signal parts comprises: classifying the plurality of synchronization signal sections into first to M-th part groups; generating first to M-th synchronization signal part bundles by concatenating one or more synchronization signal sections included in each of the first to M-th part groups in time domain; and generating the one or more synchronization signal parts based on a sum operation of the first to M-th synchronization signal part bundles, wherein M is a natural number greater than 1.

7. The operation method according to claim 1, wherein the one or more synchronization signals include one first synchronization signal, and the generating of the one or more synchronization signals comprises: concatenating all of the one or more synchronization signal parts without overlapping in time domain to generate the first synchronization signal.

8. The operation method according to claim 1, wherein a number of the one or more synchronization signals is K, the first to K-th synchronization signals generated based on the generating of the one or more synchronization signals constitute a first synchronization signal set, and K is a natural number.

9. The operation method according to claim 1, wherein the one or more synchronization signal parts include first to N-th synchronization signal parts, the one or more synchronization signals include one second synchronization signal, and the generating of the one or more synchronization signals comprises: generating the second synchronization signal by concatenating the first to N-th synchronization signal parts in time domain, wherein in the generating of the second synchronization signal, at least some of the first to N-th synchronization signal parts are concatenated so that at least part thereof overlap with each other, and N is a natural number greater than 1.

10. A first communication apparatus comprising a processor, wherein the processor causes the first communication apparatus to perform:

identifying a synchronization signal component set including at least a first synchronization signal component and a second synchronization signal component, wherein the first synchronization signal component and the second synchronization signal component differ from each other in at least one of a cross-correlation characteristic, a carrier frequency offset characteristic, or an autocorrelation characteristic; generating a plurality of synchronization signal sections based on primary coefficients respectively corresponding to the first synchronization signal component and the second synchronization signal component;

generating one or more synchronization signal parts based on a combination of the plurality of synchronization signal sections; generating one or more synchronization signals based on a combination of the one or more synchronization signal parts in time domain; and transmitting, to the second communication apparatus, the generated one or more synchronization signals.

11. The first communication apparatus according to claim 10, wherein the synchronization signal component set has J synchronization signal components as elements, and in the generating of the plurality of synchronization signal sections, the processor further causes the first communication apparatus to perform: determining a first synchronization signal component matrix using the J synchronization signal components; determining a first primary coefficient matrix having a same size as the first synchronization signal component matrix and composed of the plurality of primary coefficients; and generating the plurality of synchronization signal sections by multiplying elements corresponding to each other in the first synchronization signal component matrix and the first primary coefficient matrix, wherein J is a natural number equal to or greater than 2.

12. The first communication apparatus according to claim 10, wherein each of the plurality of synchronization signal sections corresponds to one of first to N-th time periods distinguished from each other in time domain, and in the generating of the one or more synchronization signal parts, the processor further causes the first communication apparatus to perform: performing a sum operation for synchronization signal sections corresponding to each of the first to N-th time periods among the plurality of synchronization signal sections, with respect to each of the first to N-th time periods; and generating first to N-th synchronization signal parts respectively corresponding to the first to N th time periods, based on results of the sum operations corresponding to the first to N-th time periods, wherein N is a natural number equal to or greater than 1.

13. The first communication apparatus according to claim 12, wherein in the generating of the first to N-th synchronization signal parts, the processor further causes the first communication apparatus to perform: identifying first to N-th secondary coefficients respectively corresponding to the first to N-th time periods; performing a multiplication operation between the result of the sum operation corresponding to each of the first to N-th time periods and the first to N-th secondary coefficients corresponding to each of the first to N-th time periods; and obtaining the first to N-th synchronization signal parts respectively corresponding to results of the multiplication operations corresponding to the first to N-th time periods.

14. The first communication apparatus according to claim 10, wherein the plurality of synchronization signal sections have different lengths in time domain, and in the generating of the one or more synchronization signal parts, the processor further causes the first communication apparatus to perform: classifying the plurality of synchronization signal sections into first to M-th part groups; generating first to M-th synchronization signal part bundles by concatenating one or more synchronization signal sections included in each of the first to M-th part groups in time domain; and generating the one or more synchronization signal parts based on a sum operation of the first to M-th synchronization signal part bundles, wherein M is a natural number greater than 1.

15. The first communication apparatus according to claim 10, wherein the one or more synchronization signals include one first synchronization signal, and in the generating of the one or more synchronization signals, the processor further causes the first communication apparatus to perform: concatenating all of the one or more synchronization signal parts without overlapping in time domain to generate the first synchronization signal.

16. The first communication apparatus according to claim 10, wherein a number of the one or more synchronization signals is K, the first to K-th synchronization signals generated based on the generating of the one or more synchronization signals constitute a first synchronization signal set, and K is a natural number.

17. The first communication apparatus according to claim 10, wherein the one or more synchronization signal parts include first to N-th synchronization signal parts, the one or more synchronization signals include one second synchronization signal, and in the generating of the one or more synchronization signals, the processor further causes the first communication apparatus to perform: generating the second synchronization signal by concatenating the first to N-th synchronization signal parts in time domain, wherein in the generating of the second synchronization signal, at least some of the first to N-th synchronization signal parts are concatenated so that at least part thereof overlap with each other, and N is a natural number greater than 1.

18. An operation method of a first communication apparatus, comprising:

receiving one or more synchronization signals transmitted from a second communication apparatus; and obtaining synchronization information corresponding to the second communication apparatus based on the one or more synchronization signals, wherein the one or more synchronization signals are generated at the second communication apparatus based on a combination of one or more synchronization signal parts in time domain, the one or more synchronization signal parts are generated at the second communication apparatus based on a combination of a plurality of synchronization signal sections, and the plurality of synchronization signal sections are generated at the second communication apparatus based on primary coefficients respectively corresponding to a first synchronization signal component and a second synchronization signal component, wherein the first synchronization signal component and the second synchronization signal component differ from each other in at least one of a cross-correlation characteristic, a carrier frequency offset characteristic, or an autocorrelation characteristic.

19. The operation method according to claim 18, wherein the synchronization signal component set has J synchronization signal components as elements, the plurality of synchronization signal sections are generated at the second communication apparatus by multiplying elements corresponding to each other in a first synchronization signal component matrix and a first primary coefficient matrix, the first synchronization signal component matrix is determined based on the J synchronization signal components, the first primary coefficient matrix is composed of the plurality of primary coefficients, J is a natural number equal to or greater than 2, and the first synchronization signal component matrix and the first primary coefficient matrix have same sizes.

20. The operation method according to claim 18, wherein each of the plurality of synchronization signal sections corresponds to one of first to N-th time periods distinguished from each other in time domain, the one or more synchronization signal parts are first to N-th synchronization signal parts respectively corresponding to the first to N th time periods, and the first to N-th synchronization signal parts are generated based on results of sum operations for synchronization signal sections corresponding to each of the first to N-th time periods among the plurality of synchronization signal sections.

* * * * *